US012198460B2

(12) United States Patent
Zhang et al.

(10) Patent No.: US 12,198,460 B2
(45) Date of Patent: Jan. 14, 2025

(54) TRAJECTORY PREDICTION USING DIRECTED GRAPH AND DESTINATION FEATURES

(71) Applicant: INTEL CORPORATION, Santa Clara, CA (US)

(72) Inventors: Lidan Zhang, Beijing (CN); Qi She, Beijing (CN); Ping Guo, Beijing (CN)

(73) Assignee: INTEL CORPORATION, Santa Clara, CA (US)

(*) Notice: Subject to any disclaimer, the term of this patent is extended or adjusted under 35 U.S.C. 154(b) by 477 days.

(21) Appl. No.: 17/635,792

(22) PCT Filed: Sep. 16, 2019

(86) PCT No.: PCT/CN2019/105898
§ 371 (c)(1),
(2) Date: Feb. 16, 2022

(87) PCT Pub. No.: WO2021/051224
PCT Pub. Date: Mar. 25, 2021

(65) Prior Publication Data
US 2022/0292867 A1    Sep. 15, 2022

(51) Int. Cl.
*G06V 40/10*    (2022.01)
*G06N 3/044*    (2023.01)
(Continued)

(52) U.S. Cl.
CPC .......... *G06V 40/103* (2022.01); *G06N 3/044* (2023.01); *G06N 3/048* (2023.01); *G06T 7/12* (2017.01);
(Continued)

(58) Field of Classification Search
CPC ........ G06V 10/82; G06V 40/20; G06V 10/40; G06V 20/58
See application file for complete search history.

(56) References Cited

U.S. PATENT DOCUMENTS 10,325,223 B1 *  6/2019  Arel .................... G06N 3/044
2011/0002390 A1  1/2011  Chiu et al.
(Continued)

FOREIGN PATENT DOCUMENTS

CN    110059144 A    7/2019
CN    110147892 A    8/2019
(Continued)

OTHER PUBLICATIONS

Choi et al., Looking to Relations for Future Trajectory Forecast, 2019 IEEE/CVF International Conference on Computer Vision (ICCV), Seoul, Korea (South), 2019, pp. 921-930, doi: 10.1109/ICCV.2019.00101.*
(Continued)

*Primary Examiner* — Guillermo M Rivera-Martinez
(74) *Attorney, Agent, or Firm* — Hanley, Flight & Zimmerman, LLC

(57) ABSTRACT

Systems, methods, apparatuses, and computer program products to provide stochastic trajectory prediction using social graph networks. An operation may comprise determining a first feature vector describing destination features of a first person depicted in an image, generating a directed graph for the image based on all people depicted in the image, determining, for the first person, a second feature vector based on the directed graph and the destination features, sampling a value of a latent variable from a learned prior distribution, the latent variable to correspond to a first time interval, and generating, based on the sampled value and the feature vectors by a hierarchical long short-term memory (LSTM) executing on a processor, an output vector comprising a direction of movement and a speed of the direction of movement of the first person at a second time interval, subsequent to the first time interval.

25 Claims, 11 Drawing Sheets

(51) Int. Cl.
  *G06N 3/048* (2023.01)
  *G06T 7/12* (2017.01)
  *G06T 7/246* (2017.01)
  *G06T 7/73* (2017.01)
  *G06V 10/82* (2022.01)
  *G06Q 50/00* (2012.01)

(52) U.S. Cl.
  CPC ............... *G06T 7/246* (2017.01); *G06T 7/73* (2017.01); *G06V 10/82* (2022.01); *G06Q 50/01* (2013.01); *G06T 2207/20084* (2013.01); *G06T 2207/30196* (2013.01); *G06V 2201/07* (2022.01)

(56) References Cited

U.S. PATENT DOCUMENTS

| | | | |
|---|---|---|---|
| 2018/0124423 | A1 | 5/2018 | Choi et al. |
| 2018/0322368 | A1 | 11/2018 | Zhang et al. |
| 2019/0143517 | A1 | 5/2019 | Yang et al. |
| 2019/0196464 | A1 | 6/2019 | Lockwood |
| 2019/0259182 | A1* | 8/2019 | Sarukkai .................. G06T 7/97 |
| 2019/0279382 | A1* | 9/2019 | Jiang ........................ G06T 7/55 |
| 2020/0042776 | A1* | 2/2020 | Shen ....................... G06V 10/82 |
| 2020/0283016 | A1* | 9/2020 | Blaiotta ............. B60W 60/0011 |

FOREIGN PATENT DOCUMENTS

| | | | | |
|---|---|---|---|---|
| CN | 110210417 | A * | 9/2019 | ......... G06K 9/00778 |
| JP | 2002260192 | A | 9/2002 | |

OTHER PUBLICATIONS

Hassan et al., Forecasting People Trajectories and Head Poses by Jointly Reasoning on Tracklets and Vislets, IEEE Transactions on Pattern Analysis and Machine Intelligence 2019, 2019, pp. 1267-1278, arXiv:1901.02000, doi.org/10.48550/arXiv.1901.02000.*

Zhang et al., SR-LSTM: State Refinement for LSTM towards Pedestrian Trajectory Prediction, CVPR2019, 2019, pp. 12077-12086, arXiv:1903.0279, doi.org/10.48550/arXiv.1903.0279.*

Ivanovic et al., The Trajectron: Probabilistic Multi-Agent Trajectory Modeling With Dynamic Spatiotemporal Graphs, EEE/CVF International Conference on Computer Vision (ICCV) 2019, 2019, pp. 2375-2384, arXiv:1810.0599, doi.org/10.48550/arXiv.1810.05993.*

Huynh et al., Trajectory Prediction by Coupling Scene-LSTM with Human Movement LSTM, ISVC 2019, 2019, pp. 1-14, arXiv:1908.08908, doi.org/10.48550/arXiv. 1908.08908.*

Zhang et al., Stochastic Trajectory Prediction with Social Graph Network, Jul. 24, 2019, pp. 1-10, arXiv:1907.10233v1, furnisehd vis IDS.*

Intellectual Property of Office of India, "Examination report under sections 12 & 13 of the Patents Act, 1970 and the Patents Rules, 2003," issued in connection with Indian Patent Application No. 202247008174, dated Dec. 28, 2023, 9 pages.

International Search Report and Written Opinion for International Application No. PCT/CN2019/105898, mailed on Jun. 15, 2020, 6 pages.

Peng, Q., et al., "Prediction of Trajectory Based on Markov Chains", Computer Science 37(8):189-193 (2010) Abstract.

European Search Report and Written Opinion for the European Application No. EP19945995, mailed May 9, 2023, 7 pages.

Zhang et al., "Stochastic trajectory prediction with social graph network" arXiv.org, Cornell University Library, Jul. 24, 2019, 10 pages.

Peng et al., "Prediction of Trajectory Based on Markov Chains," Computer Science, vol. 37, No. 8, ISSN: 1002-137X, published Aug. 2010, pp. 189-193, 5 pages. [English abstract included].

Zhang et al., "SR-LSTM: State Refinement for LSTM towards Pedestrian Trajectory Prediction," 2019 IEEE/CVFConference on Computer Vision and Pattern Recognition (CVPR), dated Jun. 15, 2019, pp. 12077-12086, 10 pages.

Hirakawa the course prediction, the image based on the depths study using wings and video A lab, Japan, Japan Industrial Publishing Co., Ltd., Jul. 10, 2019, vol. 30, No. 7 (Jul. 2019), pp. 1-7. Description of relevance found in Japanese Search Report issued on Jul. 24, 2023.

Zhang et al., "Stochastic Trajectory Prediction with Social Graph Network," arXiv:1907.10233v1, dated Jul. 24, 2019, pp. 1-10, 10 pages.

International Searching Authority, "Written Opinion of the International Searching Authority," issued in connection with International Application No. PCT/CN2019/105898, mailed on Jun. 15, 2020, 3 pages.

International Searching Authority, "International Search Report," issued in connection with International Patent Application No. PCT/CN2019/105898, dated Jun. 15, 2020, 3 Pages.

International Searching Authority, "International Preliminary Report on Patentability," issued in connection with International Patent Application No. PCT/CN2019/105898, dated Mar. 15, 2022, 4 Pages.

European Patent Office, "Extended European Search Report," issued in connection with European patent Application No. 19945995.9, dated May 9, 2023, 8 pages.

Japan Patent Office, "Search Report," issued in connection with Japanese Patent Application No. 2022-508777, dated Jul. 24, 2023, 45 Pages. [English Translation Included].

Japan Patent Office, "Notice of Reasons for Refusal," issued in connection with Japanese Patent Application No. 2022-508777, dated Sep. 12, 2023, 6 Pages. [English Translation Included].

* cited by examiner

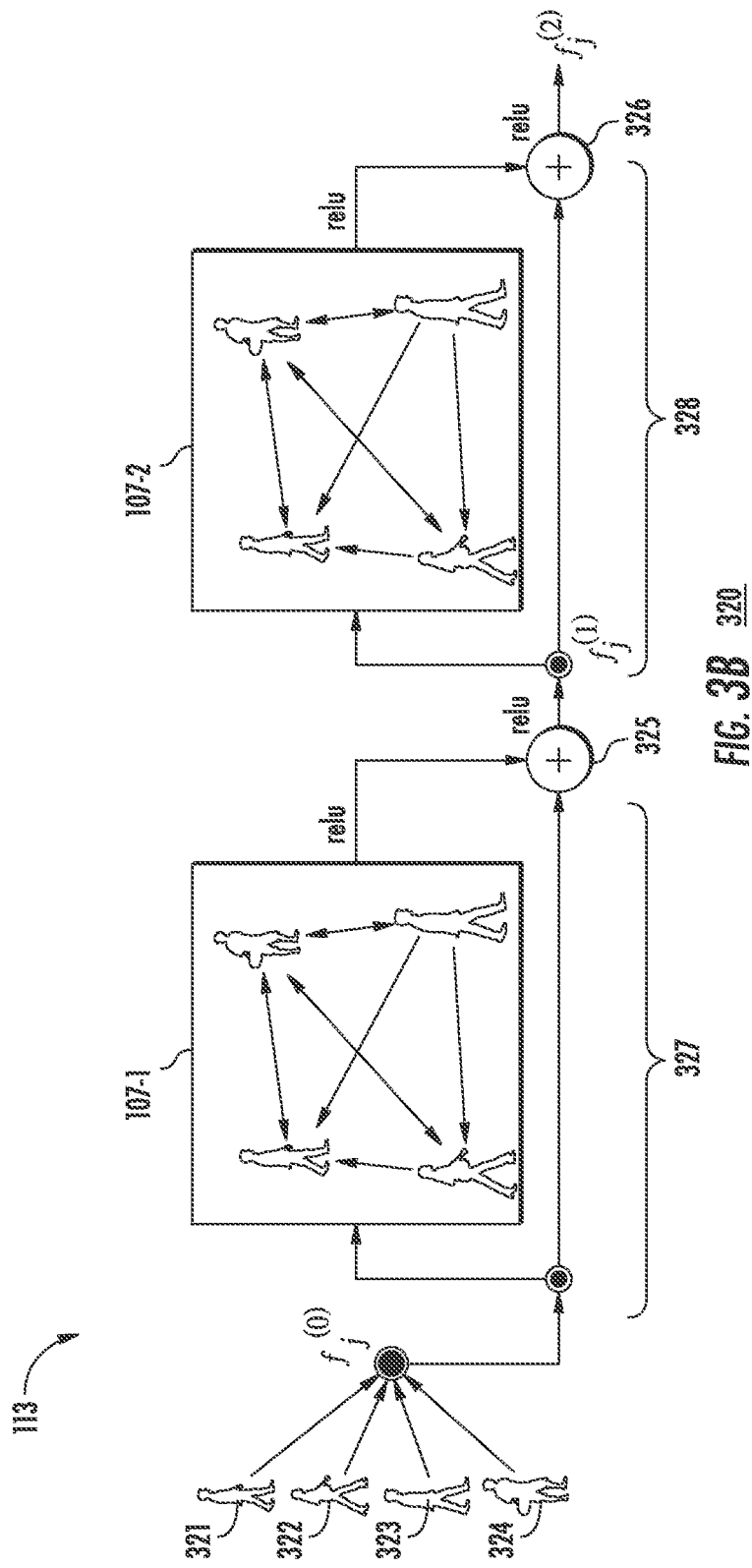

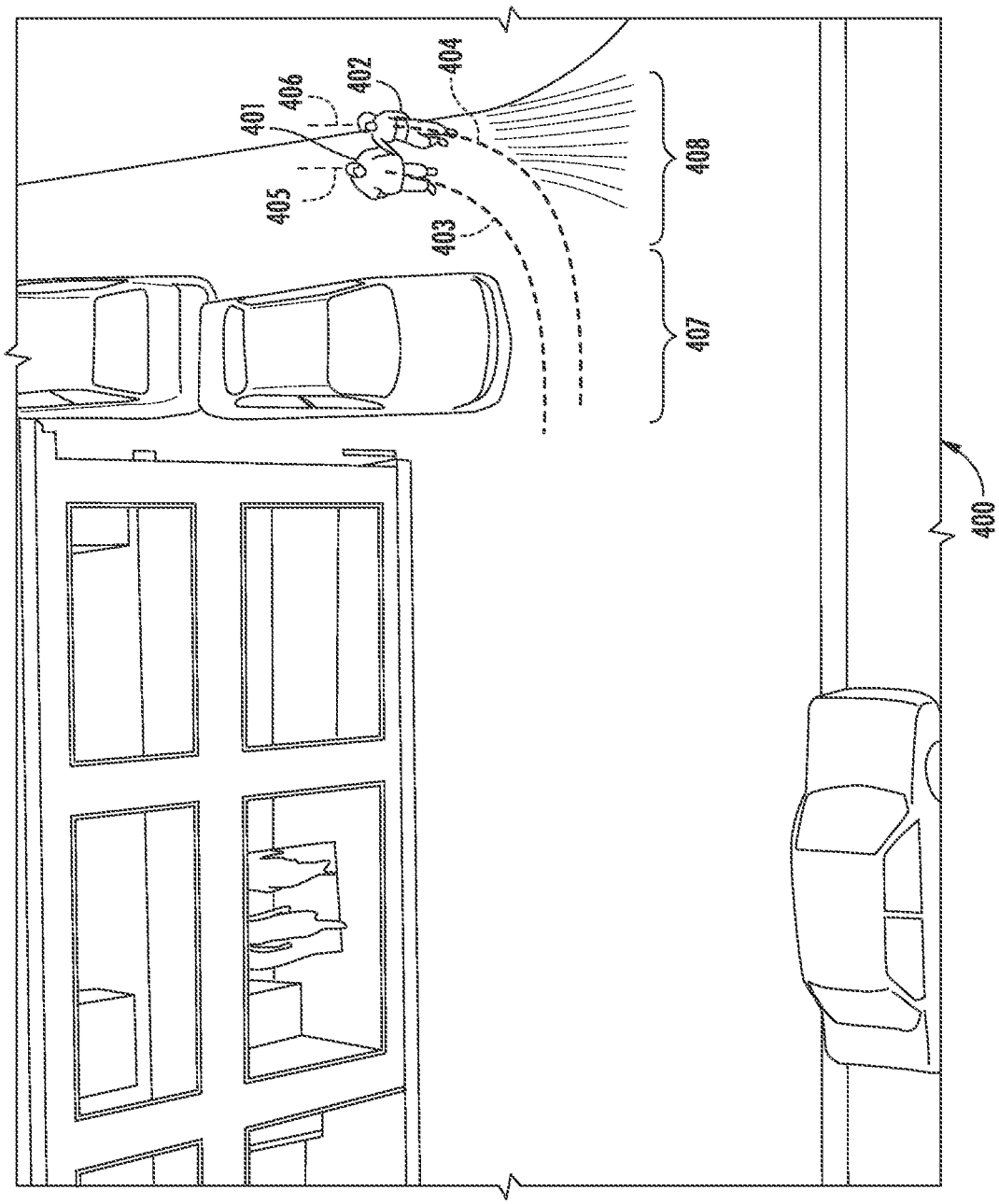

TRAJECTORY PREDICTION USING DIRECTED GRAPH AND DESTINATION FEATURES

CROSS-REFERENCE TO RELATED APPLICATION

This application is a national phase claiming the benefit of and priority to International Patent Application No. PCT/CN2019/105898, entitled "STOCHASTIC TRAJECTORY PREDICTION USING SOCIAL GRAPH NETWORKS" filed Sep. 16, 2019, which is hereby incorporated by reference in its entirety.

BACKGROUND

Programmatically predicting future locations of persons, vehicles, or other objects is difficult because of the uncertainty and/or ambiguity of any future motion. For example, a pedestrian approaching an intersection or leaving a building may move in any number of different directions at any given time. Furthermore, different external factors may impact the routes taken by the pedestrian. Therefore, it is difficult to accurately predict movement in different applications, such as autonomous vehicles, robots, drones, etc. Considering the amount of time and computing resources required for various computer vision algorithms (e.g., object detection, object tracking, etc.), the ability to more accurately predict future locations using fewer resources may provide significant improvements in collision prevention.

BRIEF DESCRIPTION OF THE DRAWINGS

FIGS. 3A-3C illustrate examples of stochastic trajectory prediction using social graph networks.

FIG. 4 illustrates an example image.

DETAILED DESCRIPTION

Figure 1:
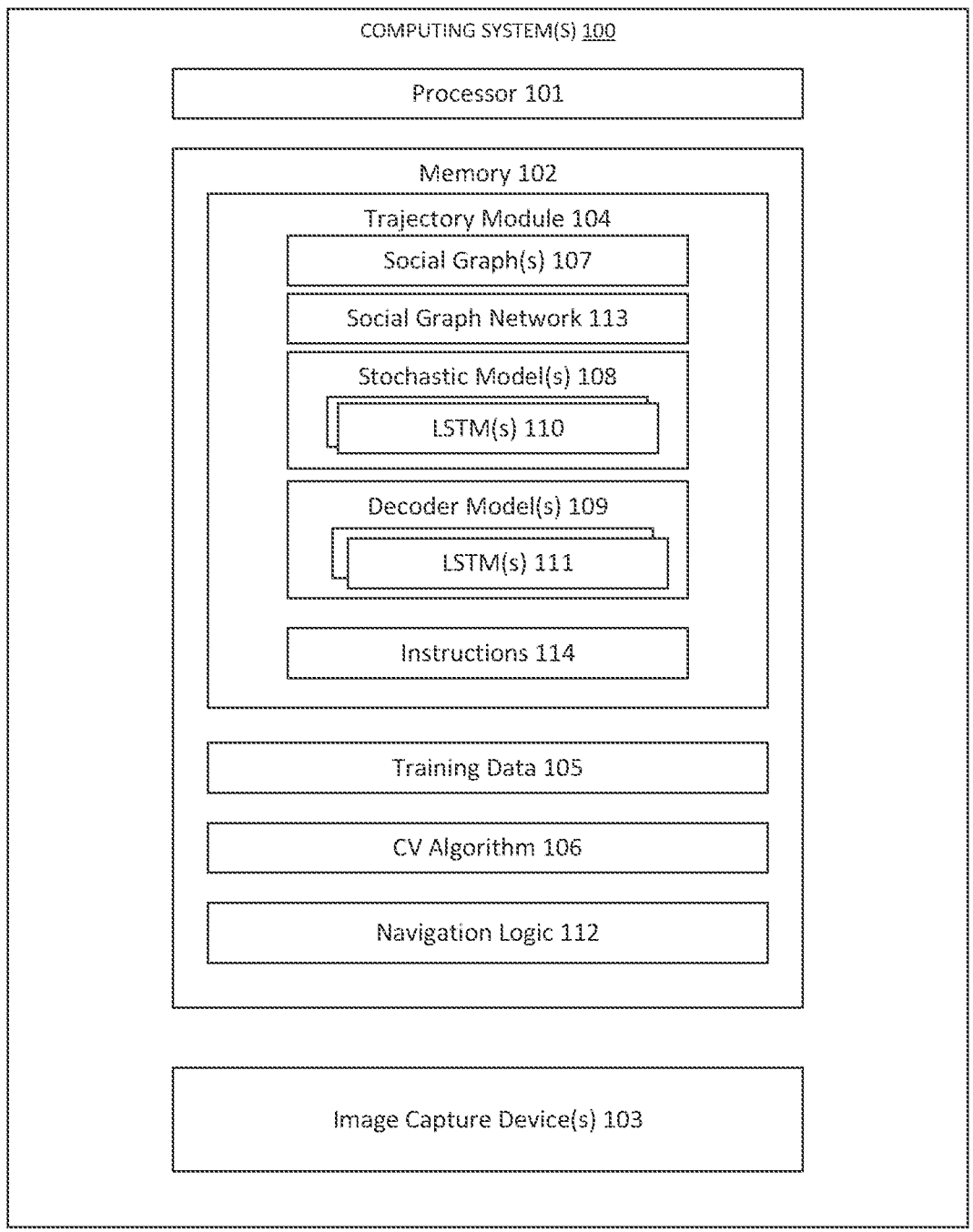
FIG. 1 illustrates an embodiment of a system.

Embodiments disclosed herein provide techniques to accurately predict possible future movement of persons depicted in one or more images using social graphs and a temporal stochastic method to model uncertainty of social interaction patterns. Generally, the social graph may model non-symmetric pairwise relationships and a social graph network may extract two types of features from the images and/or social graph. The two types of features may include individual destination-oriented features (e.g., features related to the destination of the person) and/or socially-aware features (e.g., features that describe human interactions). The social graph may comprise a directed graph that is updated at each of a plurality of time intervals given the location of persons depicted in the images and the velocity of any movement of the persons. Similarly, the temporal stochastic method to model uncertainty on social interactions between two or more persons depicted in the images may be updated at each time interval. Generally, at each time interval, the temporal stochastic method may sample a latent variable from a learned prior (that may vary across time) and use the sampled latent variable to generate diverse predictions. To generate all destination-oriented and/or social-plausible paths, the temporal stochastic method may leverage a hierarchical long short-term memory (LSTM) to progressively predict where the persons may move to next.

Advantageously, embodiments disclosed herein provide techniques to more accurately predict the movement of persons depicted in images. Doing so may improve the safety and reliability of different computing systems that predict where a person is moving. For example, using the techniques of the disclosure, a computing system may more accurately determine the future locations of one or more pedestrians depicted in an image. An autonomous vehicle may use the location data to determine that a future collision is likely to occur between the autonomous vehicle and one or more of the pedestrians. The autonomous vehicle may then perform an operation to avoid a collision with the pedestrian, e.g., by generating an alert that is outputted to the pedestrian (e.g., honking the horn of the autonomous vehicle) and/or changing the movement of the autonomous vehicle (e.g., slowing down, changing direction, and/or stopping). Embodiments are not limited in this context.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an embodiment of a computing system 100 that provides stochastic trajectory prediction using social graph networks. The computing system 100 may be any type of computing system, such as a server, workstation, laptop, mobile device, or virtualized computing system. For example, the system 100 may be an embedded system such as a deep learning accelerator card, a processor with deep learning acceleration, a neural compute stick, or the like. In some examples, the system 100 comprises a System on a Chip (SoC) and, in other embodiments, the system 100 includes a printed circuit board or a chip package with two or more discrete components. The system 100 includes at least a processor 101, a memory 102, and one or more image capture devices 103. The configuration of the computing system 100 depicted in FIG. 1 should not be considered limiting of the disclosure, as the disclosure is applicable to other configurations. The processor 101 is representative of any type of computer processor circuits, such as, central processing units, graphics processing units, or otherwise any processing unit. Further, one or more of the processors may include multiple processors, a multi-threaded processor, a multi-core processor (whether the multiple cores coexist on the same or separate dies), and/or a multi-processor architecture of some other variety by which multiple physically separate processors are in some way linked. Although one computing system 100 is depicted, multiple computing systems 100 may be communicably coupled via a communications network.

The memory 102 is representative of any type of information storage technology, including volatile technologies requiring the uninterrupted provision of electric power, and including technologies entailing the use of machine-readable storage media that may or may not be removable. Thus, the memory 102 may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although the memory 102 is depicted as a single block, the memory 102 may include multiple storage devices that may be based on differing storage technologies. Thus, for example, the memory 102 may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid-state memory devices enabling relatively quick access to programs and/or data (e.g., SRAM or DRAM). It should also be noted that the memory 102 may be made up of multiple storage components based on identical storage technology, but which may be maintained separately as a result of specialization in use (e.g., some DRAM devices employed as a main storage while other DRAM devices employed as a distinct frame buffer of a graphics controller).

The image capture device is 103 representative of any type of device that captures image data depicting an environment. One example of an image capture device 103 includes a camera with an image sensor configured to capture digital images (e.g., color images, black and white images, grayscale images, x-ray images, infrared images, etc.) depicting an environment. The environment may be any real-world environment and/or a portion thereof, such as an intersection, street, sidewalk, waterway, airspace, room, hallway, floor of a building, etc. Often, the environment is crowded, and many people may be depicted in a given image. Although depicted as a component of the computing system 100, the image capture device 103 may be external to the computing system 100. In such an example, the image capture device 103 may be representative of one or more cameras (e.g., surveillance cameras) configured to capture images of an environment and provide the images to the computing system 100 (e.g., via a communications network) for processing as described in greater detail below. As another example, however, the surveillance camera may include the components of the system 100, which may process the captured images as described in greater detail below.

In at least one embodiment, the computing system 100 is a component of (and/or communicably coupled to) an autonomous vehicle, drone, robot, or other device capable of partial and/or fully autonomous movement (collectively referred to as autonomous vehicles herein). In such examples, a navigation logic 112 may programmatically control at least a portion of the movement of the autonomous vehicle. Furthermore, the navigation logic 112 may receive signals from the trajectory module 104 based on processing of images captured by the image capture device 103. For example, the trajectory module 104 may determine that a collision is likely to occur (e.g., beyond a threshold level of likelihood) with a pedestrian depicted in an image. In such an example, the navigation logic 112 may modify the movement of the autonomous vehicle (e.g., change direction of movement, change the speed of movement, stop movement, etc.). Similarly, the trajectory module 104 and/or the navigation logic 112 may output a warning signal (e.g., honking a horn of the autonomous vehicle, emitting light signals from the autonomous vehicle, etc.). More generally, regardless of the implementation, the trajectory module 104 may output warning signals that include audio signals, visual signals, and/or data signals. For example, when integrated into a surveillance camera, the trajectory module 104 may emit an audio signal via a speaker, emit light signals via a beacon, and/or transmit a data signal to the trajectory module 104 and/or navigation logic 112 of a nearby autonomous vehicle via a wireless network.

As shown, the memory 102 includes a trajectory module 104, training data 105, one or more computer vision (CV) algorithms 106, and navigation logic 112. Although depicted as residing in the memory 102, the trajectory module 104, training data 105, CV algorithms 106, and navigation logic 112 may be implemented as hardware, software, and/or a combination of hardware and software. For example, the processor 101 may execute the instructions 114 of the trajectory module 104 to perform the functionality of the trajectory module 104 described herein. Similarly, the processor 101 may execute instructions (not pictured) of the CV algorithms 106 and/or navigation logic 102. In some embodiments, the trajectory module 104 may be a component of the CV algorithms 106 and/or the navigation logic 112.

The trajectory module 104 is generally configured to generate output reflecting predicted movement of objects depicted in one or more images, e.g., images captured by the image capture device 103 and/or images received from another source. While people are used as a reference example of objects herein, the disclosure is applicable to predicting the movement of other types of objects, such as autonomous vehicles, robots, animals, and the like. Generally, predicting the movement of humans is a challenging task for CV algorithms 106 (or other computing systems), as human movement may be affected by complex human social interaction behaviors and/or the random nature of human movement. For example, a person walking on a street may move to the left and/or move to the right to pass another person walking in front of them. Advantageously, embodiments disclosed herein address these issues by leveraging one or more social graphs 107 to capture the human interactions depicted in the images, a social network 113 to extract features from the images and/or social graph 107, one or more stochastic models 108 to generate and sample latent variables conditioned on current states encoding both individual information and interaction information, and one or more decoder models 109 to predict the movement of persons depicted in the images. The types of human (or social) interactions may include, but are not limited to, a distance between two or more people depicted in image and/or whether one person is in view of another person in the image (e.g., based on whether vectors associated with two people intersect). The stochastic models 108, decoder models 109, and/or social network 113 may be any type of computing model, such as a neural network. The use of neural networks herein as reference examples of the stochastic models 108, decoder models 109, and/or social network 113 herein are not limiting of the disclosure, as the disclosure is applicable to all types of computing models that can be trained to perform the operations described herein.

For a given image (e.g., an image captured by the image capture device 103 and/or an image in the training data 105), there may be N people depicted in the image, where N is a positive integer. The spatial location of the j-th person depicted in the image at time interval t may be denoted as $p_{j,t}=(x_{j,t}, y_{j,t})$, where x and y are the (x,y) coordinates in a 2-dimensional world-space and $0 \leq j \leq N$. Coordinates in the 2-dimensional world-space may be based on any measure of distance, such as meters, centimeters, inches, feet, etc. Doing so allows the trajectory module 104 to train and/or test based on absolute movement, whereas movement in pixel space for images may vary based on the parameters of the image capture device 103 (e.g., focal length, etc.). Therefore, the trajectory module 104 (or any component thereof) may convert image coordinates to the corresponding real-world coordinate (e.g., meters, centimeters) given known parameters of the image capture device 103. Therefore, given previously observed images (e.g., images captured at prior time intervals depicting one or more of the N people) represented as $T_{obs}$ and a trajectory history denoted by $\{p_{j,t}, j=1, \ldots N; t=1, \ldots, T_{obs}\}$, the trajectory module 104 may predict the trajectories of all N people, e.g., $\{p_{j,t}, j=1, \ldots N; t=T_{obs}+1, \ldots, T\}$. The trajectory history may be stored in the storage by the trajectory module 104 at each time interval.

The social graphs 107 are directed graphs that are generated at different time intervals (e.g., at 1 second intervals, 2 second intervals, etc.) based on the current location and velocity of people depicted in the image captured by the image capture device 103 at the corresponding time interval. Generally, the image capture device 103 may capture images at periodic time intervals, and the social graphs 107 may be generated to reflect the pairwise social relationships between people depicted in the images at the corresponding time interval. Based on an analysis of the captured images, the trajectory module 104 may identify persons in the image, determine the present location of the person, and update the trajectory history for each identified person (e.g., as metadata of the image and/or in a separate data store). The trajectory history may reflect the actual movement of each person at each time interval and may include a vector reflecting direction and/or velocity of movement at each time interval. The movement of each person at each time interval may be based on a respective image captured by the image capture device 103 depicting the person.

In one or more embodiments, a social graph 107 may be a directed graph G=(N;E;A), where N is a plurality of graph nodes, E is one or more graph edges connecting two nodes, and A is a non-symmetric adjacency matrix. Based on a given image (which may be analyzed by the CV algorithms 106 to identify persons, determine movement, determine that one person is in view of another person, identify interactions, the types of interactions, etc.), each pedestrian is assigned to a node ($n_j \in N$) in the social graph 107, and an edge $e_{ij}=(n_i, n_j) \in E$ linking from i-th to j-th person exists when the adjacency matrix entry $a_{ij}=1$. Generally, at each time interval, the current position and speed direction of each person depicted in the corresponding image is used to determine whether another person is in the view of the person and generate the social graph 107 for the corresponding time interval. For example, a CV algorithm 106 and/or the trajectory module 104 may determine whether one or more rays emitted from a first person intersect with a second person in the image to determine whether the second person is in view of the first person at a given time interval. If the trajectory module 104 determines the person is in view, the trajectory module 104 may add an edge connecting the corresponding nodes in the social graph 107 for the time interval. However, if the first and second persons are no longer in view of each other at a later time interval, the social graph 107 for the later time interval will not include an edge connecting the first and second persons. Thus the social graph 107 is dynamically changed as the relative positions of people change across images.

The trajectory module 104 may then determine (or extract) two types of features describing the image and/or the N persons depicted in the image using the social graph network 113 based on the social graph 107 and/or the image. For example, processor 101 can execute instructions 114 of the trajectory module 104 to extract features from the images based on social graph network 113 and social graph 107. A first type of feature may be individual destination features that may be denoted by $f^{(D)}$. The individual destination features may generally describe the destination of a given person, e.g., a target region in the image that serves as the destination of the person and/or any attribute thereof. More generally, the individual features may further include the current position of each person in (x,y) coordinates, the trajectory history of the person at each time interval in (x,y) coordinates, etc. Furthermore, a second type of feature that encodes destination-oriented features and social features may be determined. The second type of features may be denoted as $f^{(S)}$, and may reflect the current position of the person, the trajectory history of the person, whether the person is communicating with another person, whether the person is walking with another person, etc. In one embodiment, the feature vectors $f^{(D)}$, $f^{(S)}$ may be vectors having 32 dimensions (e.g., values for 32 different features).

For the individual features $f^{(D)}$, the social graph network 113 may comprise a one-layer multi-layer perceptron (MLP) (e.g., a neural network) with a rectified linear unit (ReLU) to concatenate the (x,y) coordinates for the person $p_{j,t}$ and the velocity $v_{j,t}=p_{j,t}-p_{j,t-1}$ of the person as input. Stated differently, the individual features $f^{(D)}$ of person j at time interval t may be determined according to the following Equation 1:

$$f_{j,t}^D = W_d[p_{j,t}, v_{j,t}] + b^d \qquad \text{Equation 1.}$$

In Equation 1, ($W^d$, $b^d$) are weight and bias parameters of the social graph network 113, respectively, and $v_{j,t}$ corresponds to the velocity of the person (determined over at least two time intervals) as demonstrated above. Therefore, Equation 1 extracts features based on the current position of each person, at least one prior location of each person, and the velocity of each person. In all remaining equations herein, subscripts t for time intervals are omitted for clarity.

As stated, the social graph network 113 may determine features $f^{(S)}$ that capture both individual destination features (e.g., $f^{(D)}$) as well as social interactions between two or more persons depicted in an image. In one embodiment, the social graph network 113 provides a ResNet-like structure that gradually learns pairwise social interactions in the residual branch by removing self-loops from the social graph 107. Formally, the output of the L-th layer of the social graph network 113 to encode features for the j-th pedestrian may be denoted by Equation 2:

$$f_j^{L+1} = f_j^L + \left( W^g \left( \sum_{\forall i, a_{ij}=1} M_{ij}(W^i x_{ij}^L + b^i) \right) + b^g \right). \qquad \text{Equation 2}$$

In Equation 2, $f_j^{(0)} = f_j^{(D)}$ at initialization, $M_{ij}$ corresponds to a message passed from person i to person j in the social graph 107, ($W^i$, $b^i$) denote weight and bias parameters for the input MLP with ReLU, and ($W^g$, $b^g$) denotes the weight and bias parameters for the global MLP with ReLU. The message may generally represent the first edge, e.g., that person i interacted with (and/or is in view of) person j in some way. The input $x_{ij}^L$ to the social graph network 113 to compute vector $f^{(S)}$ may be denoted by Equation 3:

$$x_{ij}^L = [f_i^L, f_j^L, W^r \text{Polar}_{pj}(p_i) + b^r)] \qquad \text{Equation 3.}$$

In Equation 3, $\text{Polar}_{pj}(p_i)$ corresponds to the local polar coordinates ($p_i$) having an origin of $p_j$. The polar coordinates may generally represent the distance between two people and/or the angle of a ray between two people. The message $M_{ij}$ may be determined based on the following Equation 4:

$$M_{ij}^L = \sum_{\forall i, a_{ij}=1} \alpha_{ij}^L \cdot (x_{ij}^L \odot g_{ij}^L). \qquad \text{Equation 4}$$

In Equation 4, $\alpha_{ij}^L$ is a scalar attention value applied to edge $e_{ij}$ of the social graph 107, g is a social gate, and $\odot$ is an element-wise multiplication operator. The scalar attention value $\alpha_{ij}^L$ may represent the degree of interaction, e.g., how close two people are to each other, the degree to which one person is in the view of another person, etc. Generally, Equation 4 serves as a filter to extract the relevant features at each time interval from Equation 3. Advantageously, the attention value $\alpha_{ij}^L$ measures the relative importance of each edge, while the social gate acts as an element-wise feature selector.

Equation 5 may be used by the social graph network 113 to determine the scalar attention value $\alpha_{ij}^l$ at each time interval:

$$\alpha_{ij}^l = \frac{\exp(\text{LeakyReLU}(W^a x_{ij}^L))}{\sum_{\forall i, a_{ij}=1} \exp(\text{LeakyReLU}(W^a x_{ij}^L))}. \qquad \text{Equation 5}$$

Generally, the attention value $\alpha_{ij}^l$ reflects the degree of attention person i is giving to person j as reflected by the social graph 107 and the extracted features based on the weights applied to the location of each person. Stated differently, the attention value $\alpha_{ij}^l$ may be based on the distance between two people and/or the direction of movement of each person. Therefore, for example, Equation 5 may compute a larger attention value $\alpha_{ij}^l$ when two people are close to each other relative to an attention value $\alpha_{ij}^l$ computed when two people are far away from each other.

The social graph network 113 may compute the social gate g according to the following Equation 6:

$$g_{ij}^L = \text{sigmoid}(W^s x_{ij}^L + b^s) \qquad \text{Equation 6.}$$

In example Equation 6, ($W^s$, $b^s$) correspond to the weight and bias parameters of the social gate, respectively. As shown, the social gate may use a sigmoid function to produce element-wise attention values. Generally, a feature vector may have a plurality of dimensions (e.g., a dimension for each feature of a plurality of features). However, it may be difficult to determine which dimensions, or elements, of the feature vector is important (or relevant). Therefore, the social graph network 113 may apply a filter (e.g., element-wise multiplication operation of the social gate) to the feature vector and generate the vector $f^{(S)}$. In at least one embodiment, the feature vector $f^{(S)}$ is an output of the last layer of the social graph network 113.

The stochastic model 108 includes one or more LSTMs 110 to encode the vectors $f^{(D)}$, $f^{(S)}$ for each person and sample a latent variable $\varphi$ for use as a value of a variable $z_t$ added at each time interval and conditioned on $f^{(S)}$. An LSTM may be an artificial recurrent neural network (RNN) architecture that includes a cell, an input gate, an output gate and a forget gate (each not pictured). The cell may store values over time intervals while the gates regulate the flow of information into and out of the cell. The stochastic model 108 may sample the latent variable according to the following Equations 7-8:

$$p_\psi(z_t | f_{<t}^S) = \text{LSTM}_\psi(f_{t-1}^S) \qquad \text{Equation 7.}$$

$$q_\phi(z_t | f_{\leq t}^S) = \text{LSTM}_\phi(f_t^S) \qquad \text{Equation 8.}$$

Therefore, in the examples shown, the stochastic model 108 may include two LSTMs 110, namely prior $\text{LSTM}_\psi(f_{t-1}^S)$ in Equation 7, and posterior $\text{LSTM}_\phi(f_t^S)$ in Equation 8. However, the stochastic model 108 may include any number of LSTMS 110, and the use of two LSTMs should not be considered limiting of the disclosure. The prior $\text{LSTM}_\psi(f_{t-1}^S)$ of Equation 7 may correspond to a Gaussian mean and variance, while the posterior $\text{LSTM}_\phi(f_t^S)$ of Equation 8 may correspond to a Gaussian mean and variance. Generally, during training, the Gaussian distribution (e.g., mean and variance) of the prior $\text{LSTM}_\psi(f_{t-1}^S)$ is refined to approximate the Gaussian distribution of the posterior LSTM$_\phi$(f$_t^S$). Once the distributions reach a threshold degree of similarity, the prior distribution of the prior LSTM$_\psi$(f$_{t-1}^S$) may replace the posterior distribution of the posterior LSTM$_\phi$(f$_t^S$). Therefore, the stochastic model 108 may sample the latent variable based on the Gaussian distribution of the posterior LSTM$_\phi$(f$_t^S$) during training and may sample the Gaussian distribution of the prior LSTM$_\psi$ (f$_{t-1}^S$) during testing (or runtime, or inference) operations. The prior LSTM$_\psi$(f$_{t-1}^S$) may generally be learned based on past trajectory data of persons with recursive hidden states. The past trajectory data may include vectors describing the direction and speed of movement of the person at each time interval. The posterior LSTM$_\phi$(f$_t^S$) encodes scenes for the current time interval. As stated, the prior LSTM$_\psi$(f$_{t-1}^S$) is trained to approximate the posterior LSTM$_\phi$(f$_t^S$) to capture uncertain social interactions.

The decoder model 109 is generally configured to generate output to predict the movement of a given person depicted in an image at time interval t. In one embodiment, the decoder model 109 leverages hierarchical LSTMs 111 to progressively decode the feature vectors and predict the offset (e.g., an output vector) of the location of each person. The output generated by the decoder model 109 may take any form suitable to convey direction and/or speed of movement. For example, in one embodiment, the predicted movement may comprise a vector indicating a velocity and direction of movement (e.g., movement in the (x,y) direction at a velocity in meters per second). However, during training, the inputs to the decoder model 109 may comprise the ground truth data of the previous image (e.g., the actual movement of the person). The hierarchical LSTMs 111 may be a generation LSTM represented by LSTM$_\theta$ that stacks the two LSTMs with different inputs. The first LSTM 111-1 may receive social inputs (e.g., the feature vector f$^{(S)}$) to predict social reactions, and is combined with the second LSTM (e.g., an LSTM 111-2 for individual destination feature vector f$^{(D)}$) to generate socially-acceptable and destination-oriented trajectories. Equation 9 below may describe the operations performed by the decoder model 109:

$$p_\theta(y_t|z_{\leq t}f_{<t}^S f_{<t}^D) = \text{LSTM}_\theta(z_t, f_{t-1}^S, f_{t-1}^D) \quad \text{Equation 9.}$$

In Equation 9, y$_t$ corresponds to the output of the decoder model 109, e.g., a vector specifying the predicted speed and direction of movement of a given person at a time interval based on the sampled latent variable z and the feature vectors f$^{(D)}$, f$^{(S)}$ for each person. As stated, the output vector y$_t$ may be in any real-world unit of measure. In some embodiments, the decoder model 109 may compute a plurality of different estimated vectors y$_t$ for each person for each person depicted in the image. In one such embodiment, the LSTM$_\theta$ of the decoder model 109 may correspond to Gaussian distribution with mean and variance. The decoder model 109 may sample the speed and/or direction of each person from this Gaussian distribution.

The trajectory module 104 (including any parameters of the stochastic model 108, decoder model 109, social graph network 113, and/or LSTMs 110-111) may be trained by maximizing the variational lower bound "ELBO". In one embodiment, the training of the trajectory module 104 may be based on the following Equation 10:

$$\mathcal{L} = \sum_{i=1}^T [E_{q_\phi(z_t|f_{\leq t})}\log p_\theta(v_t|z_{\leq t}, f_{<t}) - \quad \text{Equation 10}$$
$$\beta D_{KL}(q_\phi(z_t|f_{\leq t})\|p_\psi(z_t|f_{<t}))].$$

Generally, the training uses the reparameterization trick to optimize Equation 10 with stochastic gradient descent during a backpropagation operation. The training may be based on a plurality of images in the training data 105 that are associated with trajectory data for each depicted person and ground-truth future locations indicating where each depicted person moved to next. In one embodiment, the trajectory module 104 converts trajectory coordinates of each person to world coordinates and interpolates the converted coordinates to sample the coordinate at periodic intervals (e.g., 0.5 seconds, 1 second, etc.). Therefore, for each training image, the trajectory module 104 analyzes each image and generates the social graph 107. The social network 113 may then extract the feature vectors f$^{(D)}$, f$^{(S)}$, the stochastic model 108 may sample the latent variable, and the decoder model 109 may predict the next location of each person depicted in the image. The weights, biases, activations, and any other learnable parameters (e.g., of the models 108-109, LSTMs 110-111, social graph network 113, etc.) may then be refined during training based on how close the predicted location for each person is to the ground-truth location for each person (e.g., on the accuracy of the predicted location generated by the decoder model 109).

The accuracy may be based on any feasible metric, such as average displacement error (ADE) and/or final displacement error (FDE). The ADE may correspond to the averaged Euclidean distance between the ground truth and predicted location coordinates over all time intervals. The FDE may correspond to the Euclidean distance between the ground truth and the predicted coordinates in a final image of a scene (e.g., if a person is depicted in 5 images, the predicted location generated based on the fifth image). The value of hyperparameter β of Equation 10 may be based on a balance of reconstruction error and sample diversity. The left side of Equation 10 may be reduced to l$_2$ reconstruction loss between the predicted result and the ground-truth (e.g., the predicted location output of the decoder model 109 relative to the actual location reflected by the ground-truth of the training data 105).

Once trained, the trajectory module 104 may more accurately predict the future movement of people depicted in images captured by the image capture device 103. For example, if an image depicts 10 people in a scene, the trajectory module 104 may predict the movement of each person. However, if the trajectory module 104 determines that the predicted location of one or more people may result in an unsafe situation (e.g., may result in a collision with an autonomous vehicle, robot, etc., based on one or more vectors generated by the trajectory module 104 intersecting with a vector corresponding to the trajectory of the autonomous vehicle), the trajectory module 104 may perform any number of operations. For example, the trajectory module 104 may provide the predicted location of the one or more people to the navigation logic 112, which may modify the movement of the associated autonomous vehicle to avoid the collision. As another example, audio and/or visual alerts may be outputted by the trajectory module 104 to warn the persons of the possible danger. As another example, to determine whether the predicted location may result in a collision, the trajectory module 104 may determine whether a likelihood of collision exceeds a collision threshold. The likelihood of collision may be based on the predicted movement of the persons and/or vehicles. For example, if the vectors for one or more persons are determined to intersect with a vector for a vehicle, the trajectory module 104 may determine that the likelihood of collision exceeds the collision threshold. In some embodiments, the trajectory module 104 may compute a score reflecting the likelihood of collision.

Figure 2:
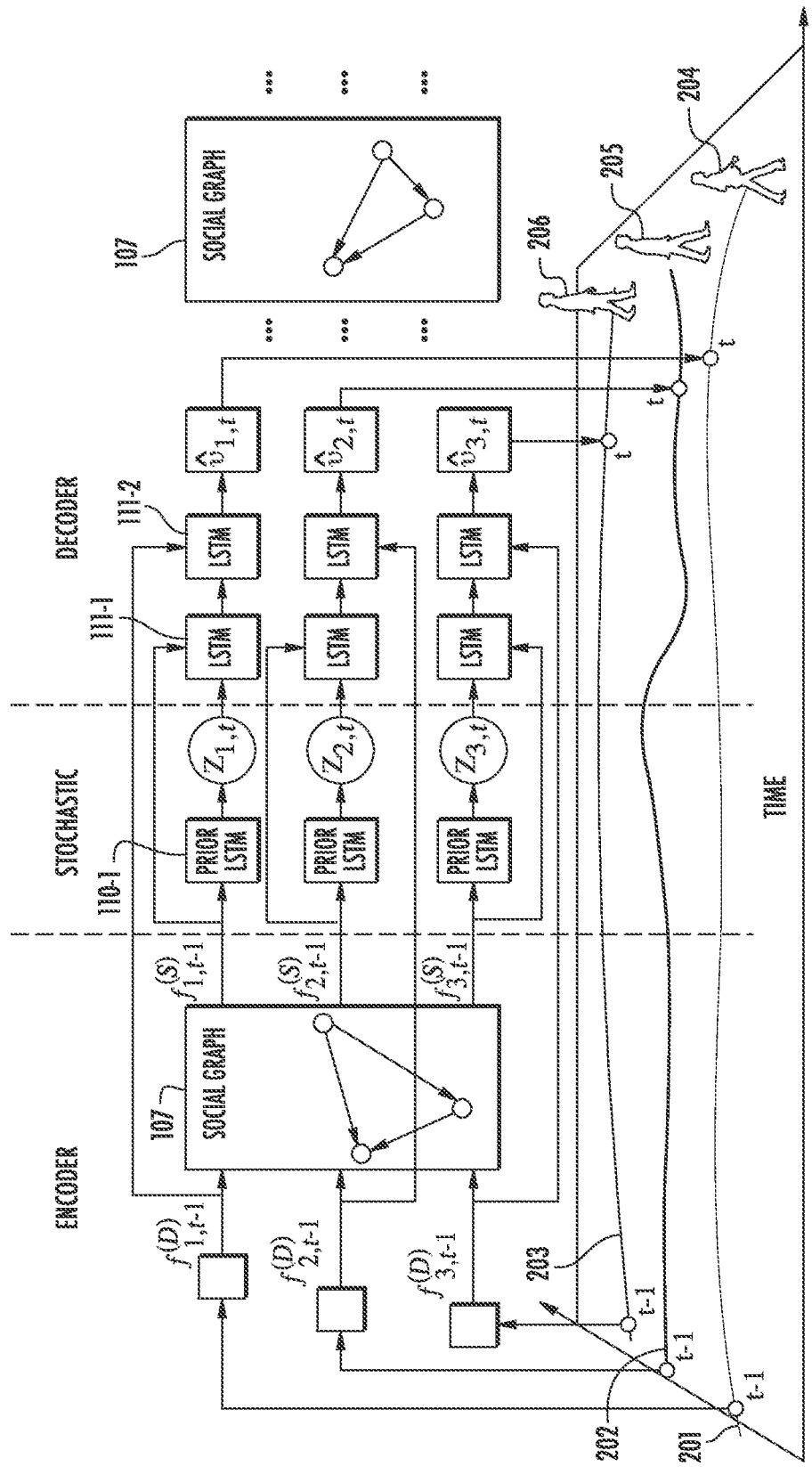
FIG. 2 illustrates an example of stochastic trajectory prediction using social graph networks.

FIG. 2 is a schematic 200 illustrating an example of stochastic trajectory prediction, according to one embodiment. As shown, the schematic 200 depicts example trajectory histories 201-203 for persons 204-206 depicted in one or more images. On the left side of FIG. 2, the trajectory histories 201-203 may include locations of each person 204-206 at an example time interval t−1. Generally, the trajectory module 104 may then predict the location of each person 204-206 at time interval t, where time interval t is later in time than time interval t−1.

As shown, the feature vectors $f_{1,t-1}^{(D)}$, $f_{2,t-1}^{(D)}$, $f_{3,t-1}^{(D)}$ may be computed for each person 204-206, respectively, e.g., based on Equation 1 above. As stated, these feature vectors may correspond to destination-based features, such as where each person 204-206 is traveling towards, the velocity of travel, prior history of movement, etc. Based on the extracted features $f_{1,t-1}^{(D)}$, $f_{2,t-1}^{(D)}$, $f_{3,t-1}^{(D)}$ and/or the analysis of each image, the social graph 107 may be generated. As stated, the social graph 107 represents each person identified in an image as a node. If two people are determined to interact in any way, an edge may connect the nodes representing the two people in the social graph 107.

As further shown in FIG. 2, the feature vectors $f_{1,t-1}^{(S)}$, $f_{2,t-1}^{(S)}$, $f_{3,t-1}^{(S)}$ may be computed for each person 204-206, respectively, by the social graph network 113 based on the images, the feature vectors $f_{1,t-1}^{(D)}$, $f_{2,t-1}^{(D)}$, $f_{3,t-1}^{(D)}$ and/or the social graph 107. Generally, the feature vectors $f_{1,t-1}^{(S)}$, $f_{2,t-1}^{(S)}$, $f_{3,t-1}^{(S)}$ may be computed according to Equations 2-6 above, and reflect destination-oriented as well as social features (e.g., whether each person is interacting with one or more other people).

For each person 204-206, the stochastic model 108 may include an LSTM 110-1 to receive the corresponding feature vector $f^{(S)}$ as input and sample the latent variable z based on Equations 7-8 above. The LSTM 111-1 of the decoder model 109 may then receive the feature vector $f^{(S)}$ and the sampled latent variable z as input. The output of LSTM 111-1 may then be provided as input to the LSTM 111-2 of the decoder model 109 along with the feature vector $f^{(D)}$. The decoder model 109 may then compute vectors $\hat{v}_{1,t}, \hat{v}_{2,t}, \hat{v}_{3,t}$ reflecting the predicted movement of each person (e.g., speed of travel in the direction of the (x,y) coordinates). In one embodiment, the vectors are computed according to Equation 9 above. Generally, the vectors may include (x,y) coordinates indicating a direction of movement (e.g., (2,5) units in the x- and y-directions, respectively) and a velocity (e.g., n units per second, where n is any numerical value) of the direction movement of each person. These operations may be repeated any number of times to predict movement at future time intervals (e.g., t+1, t+2, . . . , t+n).

Figure 3A:
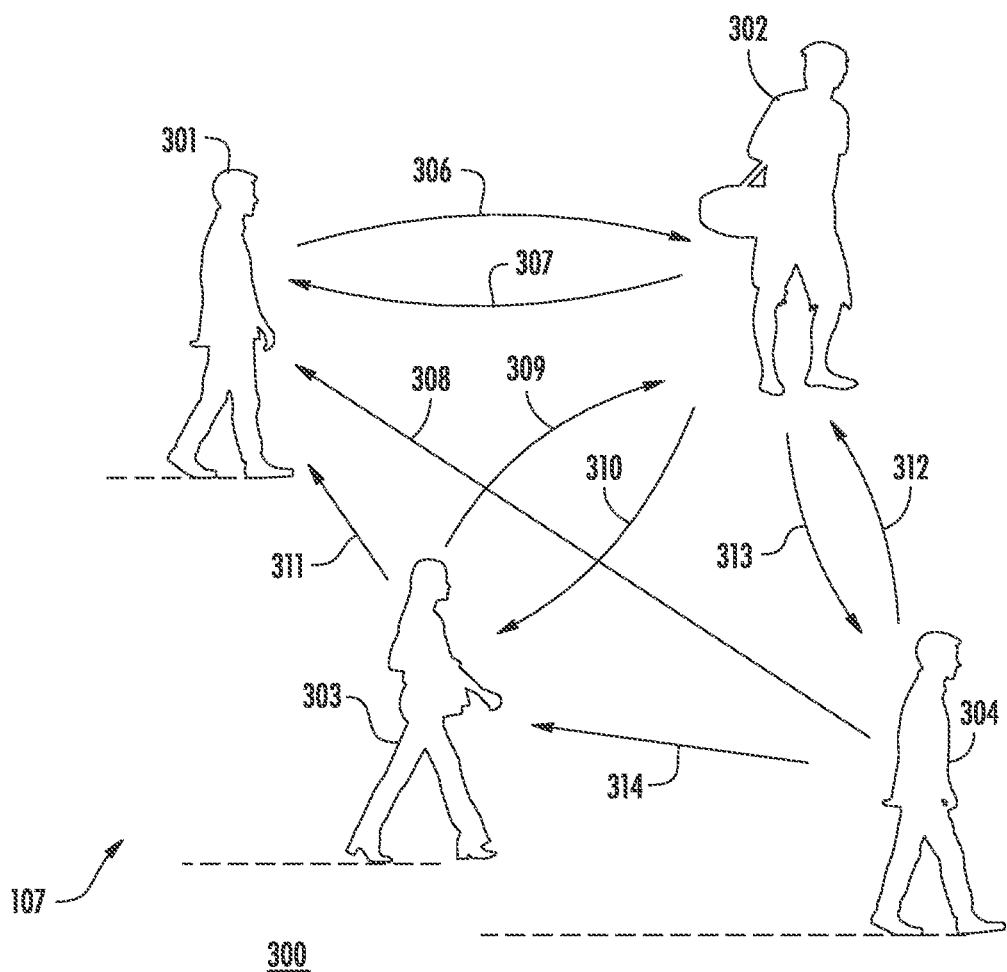

FIG. 3A is a schematic 300 illustrating an example representation of a social graph 107. As shown, FIG. 3A depicts four example persons 301-304. Each person 301-304 may be represented as a node in the social graph 107. The edges 306-314 reflect that one of the persons 301-304 (e.g., person 304) is in view of a different one of the persons 301-304 (e.g. person 303), and the future path of person 304 may be affected by person 303. More generally, the existence of an edge in the graph 107 is determined by pairwise positions. Therefore, if person A is ahead of (or in view of) person B, an edge in the graph 107 from person A to person B may be generated.

For example, edge 306 reflects that person 302 is in the view of person 301, while edge 307 reflects that person 301 is in the view of person 302. When the interaction is in one direction, only a single edge is generated in the social graph 107. For example, edge 311 reflects that person 303 is paying attention to person 301, while the absence of an edge from person 301 to person 303 indicates that person 301 is not interacting with person 303.

FIG. 3B is a schematic 320 illustrating an example social graph network 113. Persons 321-324 in FIG. 3B may correspond to the persons 301-304 depicted in FIG. 3A. As shown, the social graph network 113 includes two stacked layers 327, 328, where the output of layer 328 is conditioned based on the output of layer 327. For example, layer 327 may correspond to a previous time interval t=0, while layer 328 may correspond to a current time interval t=1. As shown, the input to layer 327 includes the feature vector $f_j^{(0)}$ (e.g., $f_j^{(S)}$ at time interval t=0) for each person 321-324. The layers 327, 328 learn pairwise interactions between the persons 321-324 in the residual branch of the ReLU by removing self-loops (e.g., a loop between the same person). Generally, the output for the layers 327, 328 may be computed based on Equation 2 above (with additional operations performed according to Equations 3-6).

In the embodiment shown in FIG. 3B, layer 327 of the social graph network 113 may leverage the social graph 107-1 of layer 327 to extract additional features for each person, which may be added to the input feature vector $f_j^{(0)}$ using the addition operator 325 to produce an output. The output of addition operator 325 may be the feature vector $f_j^{(1)}$, which may be provided as input to layer 328. Features extracted from social graph 107-2 may then be added to feature vector $f_j^{(1)}$ using addition operator 326 to produce the output feature vector $f_j^{(2)}$.

Figure 3C:
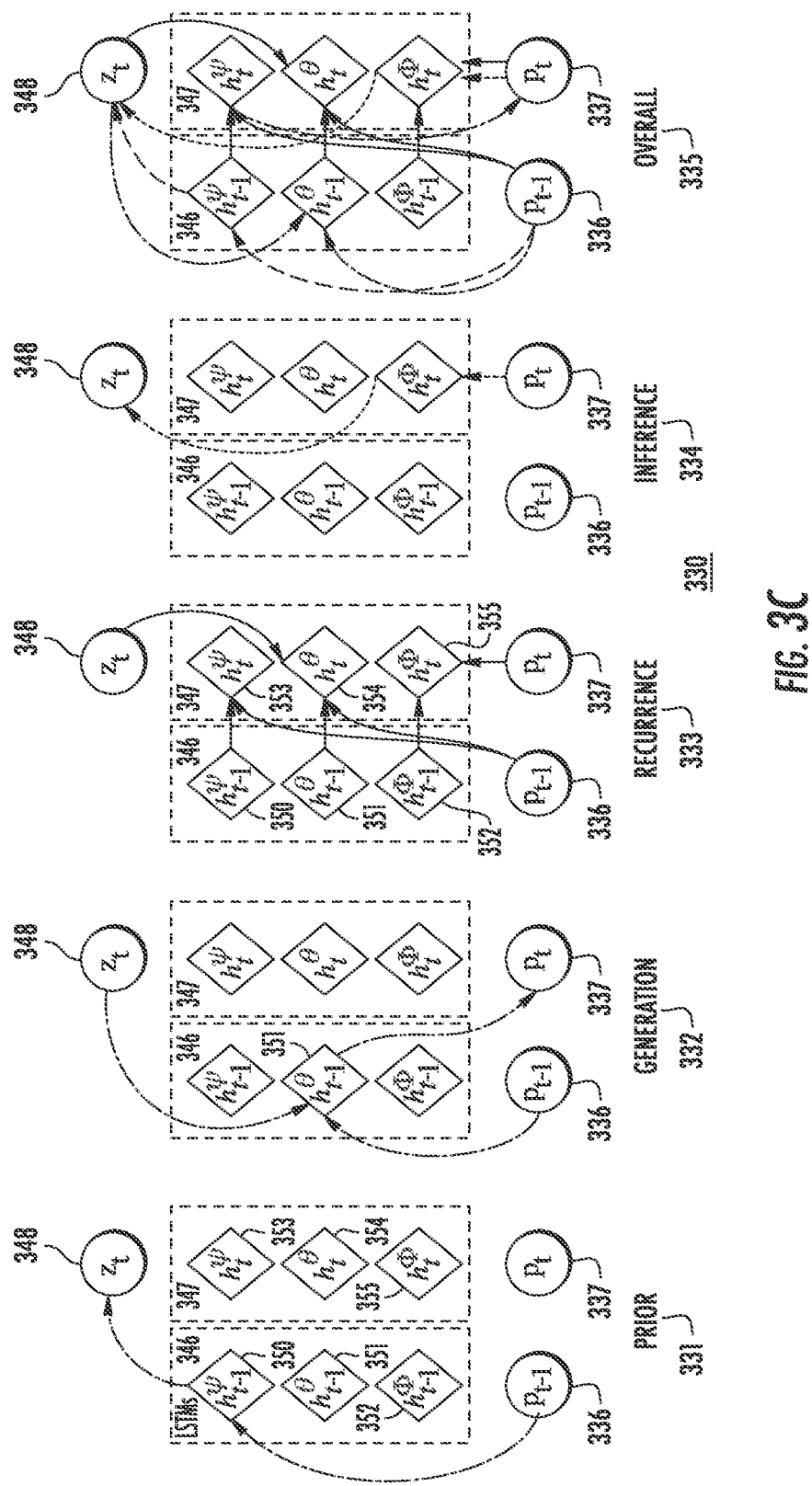

FIG. 3C is a schematic 330 depicting example operations performed by the trajectory module 104, according to one embodiment. Prior phase 331 reflects computation of the conditional prior $z_t$ 348 using Equation 7, where the prior is learned based on prior trajectories of each person with recursive hidden states. In FIG. 3C, the "h" of LSTMs 350-355 reflect the hidden states of one or more of LSTMs 110-111. As shown, the conditional prior is computed based on polar coordinates 336 of a person at time interval t−1 by LSTM group 356 (including LSTMs 350-352). LSTM 350 may apply equation 7 to learn the conditional prior $z_t$ 348.

The generation phase 332 reflects a generation function used by the decoder model 109 to predict the location 337 of a person depicted in an image at time interval t based on Equation 9 and the location 336 at time t−1. As shown, the prior location 336 of the person and the sampled latent variable $z_t$ from the prior 348 may be provided as input to LSTM 351, which outputs the predicted location 337 of the person. As stated, the predicted location 337 may be a vector that indicates speed and direction of travel.

Recurrence phase 333 updates the recurrent hidden states h of the LSTMs 353-355 of LSTM group 347. Generally, as shown, the hidden states h of the LSTMs 353-355 are updated based on the prior states h of the LSTMs 350-352, the location coordinates 336 for time t−1, the sampled value from the conditional prior 348, and the location coordinates 337 for time t.

Inference phase 334 reflects the inference of the latent variables based on Equation 8 above. As shown, the latent variable is inferred based on the location data 337 for time t. Overall phase 335 is a combination of phases 331-334 and may reflect the operations performed by the trajectory module 104 (and/or the components thereof).

FIG. 4 illustrates an example image 400. The image 400 may be captured by an image capture device 103 and/or received by the trajectory module 104 from another source. The CV algorithms 106 may analyze the image 400 to identify persons 401, 402 therein. As stated, destination feature vector $f_j^{(D)}$ may be computed for each person 401, 402. Similarly, a social graph 107 may be generated for the image 400. The social graph 107 may assign persons 401, 402 to respective nodes, and an edge may connect the nodes representing persons 401, 402. For example, the edge may associate persons 401, 402 based on one or more of: that persons 401, 402 are walking side-by-side, that persons 401, 402 are in view of each other, that persons 401, 402 are holding hands, and/or the ground truth trajectories 405, 406 of persons 401, 402. The ground truth trajectories 405, 406 may correspond to the actual paths of the persons 401, 402 at prior time intervals. The social network 113 may then extract the feature vector $f_j^{(S)}$ for each person 401, 402, and the stochastic model 108 may sample a value for the latent variable $z_t$ from the learned prior.

The decoder model 109 may then compute one or more predicted trajectories for each person 401, 402. As shown, the decoder model 109 may determine a plurality of trajectories 407, 408, for persons 401, 402, respectively. Generally, the trajectories 407, 408 reflect the estimated future travel for each person 401, 402. However, the most likely trajectories 403, 404, may be returned as the most probable trajectories, e.g., by sampling the Gaussian distribution computed using equation 9 above. As shown, because of the interactions between persons 401, 402, the decoder model 109 computes related trajectories 403, 404, reflecting that the persons are likely to continue traveling together.

Figure 5:
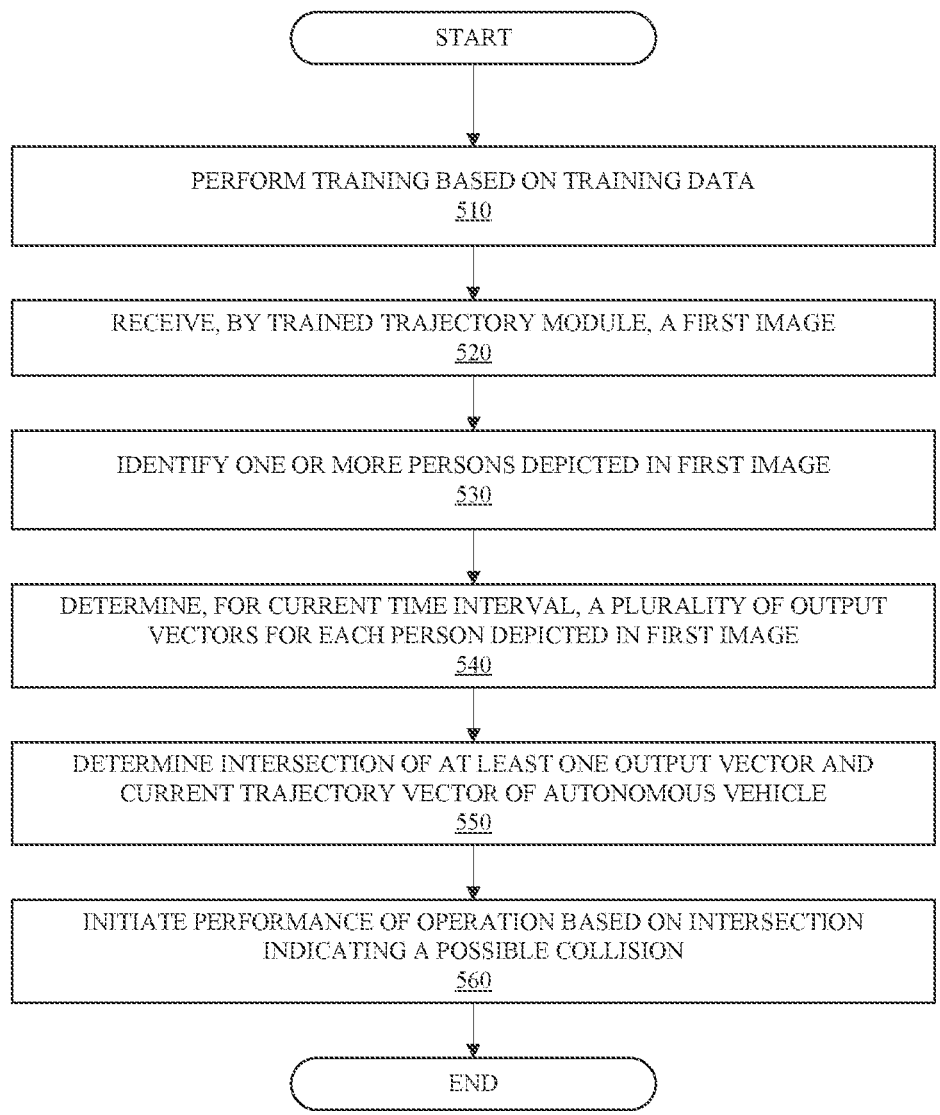
FIG. 5 illustrates embodiment of a first logic flow.

FIG. 5 illustrates an embodiment of a logic flow 500. The logic flow 500 may be representative of some or all of the operations executed by one or more embodiments described herein. For example, the logic flow 500 may be representative of some or all of the operations to provide stochastic trajectory prediction using social graph networks. Embodiments are not limited in this context.

As shown, at block 510, the training of the trajectory module 104 and/or the components thereof is performed based on the training data 105. As stated, the training data 105 includes images depicting people moving in an environment. Each image of the training data 105 may include labels (or other types of metadata) indicating, for each person in the image, ground truth data reflecting the actual movement of the person (e.g., a vector comprising direction and speed) subsequent to the captured image (e.g., where the person actually moved at time t=1 subsequent to an image depicting the person at time t=0). At block 520, the trained trajectory module 104 may receive a first image captured by an image capture device 103. For example, a stationary surveillance camera may capture images of an environment at periodic time intervals, and the first image received at block 520 may correspond to one of the captured images of the environment.

At block 530, the trajectory module 104 and/or a CV algorithm 106 may identify one or more persons depicted in the first image. For example, the persons may be detected using human detection, tracking, identification algorithms, etc. More generally, any feasible technique may be used to identify persons in a given image. At block 540, the decoder model 109 may compute a plurality of vectors for each person, where each vector corresponds to a predicted speed and direction of movement of each person. In at least one embodiment, the decoder model 109 may return a first vector of the plurality of vectors as the most likely course of movement the person will take. In one embodiment, the first vector is returned by sampling the learned prior distribution generated based on Equation 9.

At block 550, the trajectory module 104 may determine that one or more of the output vectors computed at block 540 intersects with a trajectory vector reflecting the movement of an autonomous vehicle. If the vectors intersect at one or more points in the environment, the trajectory module 104 may determine that a collision may occur between the person associated with the output vector and the autonomous vehicle. In some embodiments, the trajectory module 104 may determine that a likelihood of the collision exceeds a collision threshold, e.g., by computing a score reflecting the likelihood of collision, where the score is based on whether the vectors intersect. In one embodiment, the autonomous vehicle may be depicted in the first image. In such an example, the trajectory module 104 may determine the predicted movement of the autonomous vehicle based on previous images depicting the autonomous vehicle, the direction of travel of the autonomous vehicle, etc. In other embodiments, the computing system 100 may be a component of the autonomous vehicle. In such embodiments, navigation logic 112 may provide the predicted movement of the autonomous vehicle. The trajectory module 104 and/or the navigation logic 112 may then compare the vectors computed at block 540 to the projected movement of the autonomous vehicle to determine whether the vectors may intersect.

At block 560, a predefined operation may be performed based on a determination that a collision may occur between an autonomous vehicle and one or more persons depicted in the first image. For example, if a first vector for a first person reflecting the most likely movement of the first person indicates a collision may occur with a first autonomous vehicle, an alert may be generated to warn the first person and/or the navigation logic 112 of the first autonomous vehicle. Stated differently, the predefined operation may be performed based on a determination that the likelihood of collision exceeds a collision threshold. Doing so may allow the navigation logic 112 to alter the movement of the autonomous vehicle to avoid the collision (e.g., slow down, stop, turn, etc.).

Figure 6:
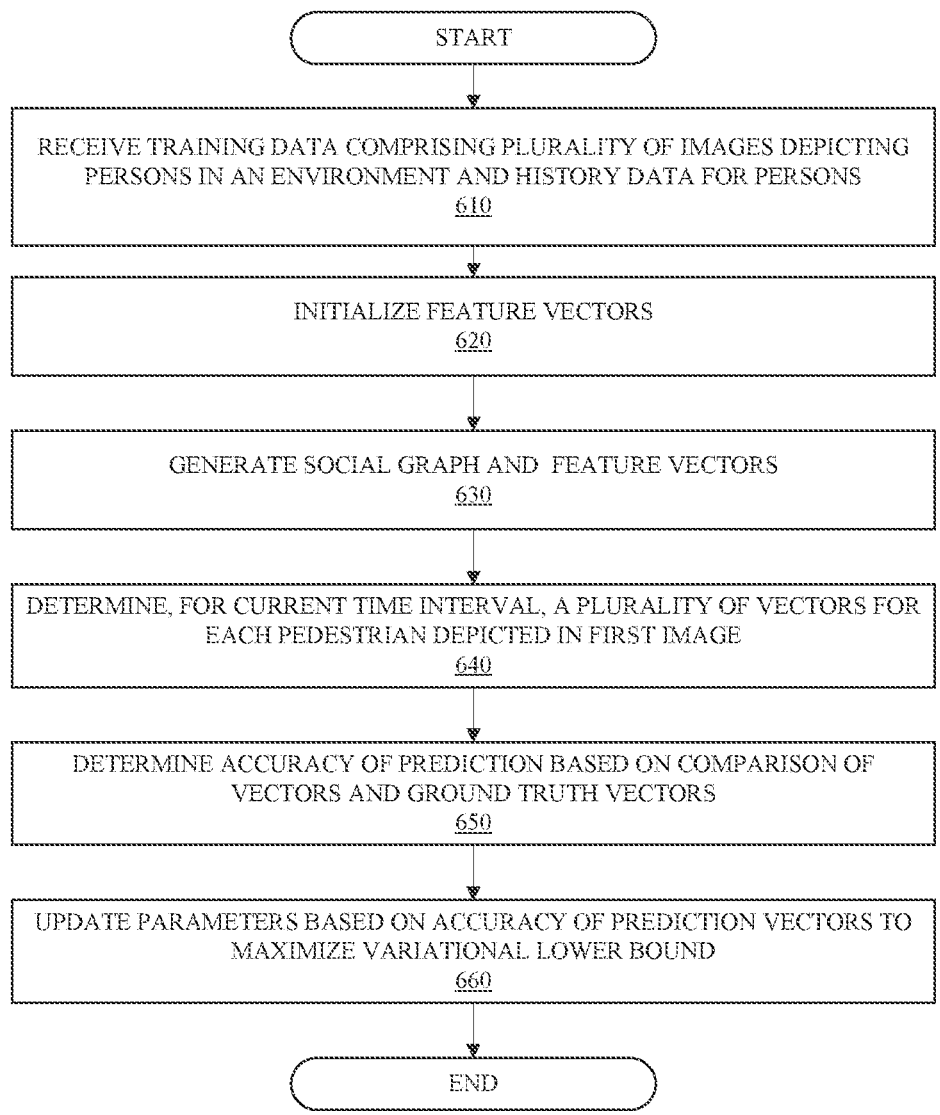
FIG. 6 illustrates an embodiment of a second logic flow.

FIG. 6 illustrates an embodiment of a logic flow 600. The logic flow 600 may be representative of some or all of the operations executed by one or more embodiments described herein. For example, the logic flow 600 may be representative of some or all of the operations to train the trajectory module 104. Embodiments are not limited in this context.

As shown, at block 610, training data 105 may be received by the trajectory module 104. The training data 105 may comprise a plurality of images of an environment captured at different time intervals. The images may depict one or more persons. The training data 105 may further include ground-truth data reflecting the actual movement of the depicted persons (e.g., vectors indicating direction and speed of movement). At block 620, the feature vectors $f^{(D)}$, $f^{(S)}$ may be initialized for each person depicted in a first image. At block 630, the feature vectors $f^{(D)}$, $f^{(S)}$ and the social graph 107 are computed according to Equations 1-6 above. The feature vectors may be for each person depicted in the first image from the training data 105. The feature vectors may reflect a destination of each person, which other persons are in view of a given person, and/or the distance between two people. The social graph 107 is generated for the first image. Furthermore, during training, Equations 7-8 above may be applied to learn the conditional prior distribution based on the posterior prior distribution and allow the stochastic model 108 to sample values therefrom. As stated, during training, values are sampled from the posterior distribution to learn the prior distribution.

At block 650, the decoder model 109 applies Equation 9 to compute a plurality of vectors for each person depicted in the image. Each vector may generally describe a predicted direction and speed of movement of the person. The vectors may describe the direction in (x,y) coordinates and the speed of movement in any units and/or format (e.g., meters per second, feet per second, etc.). At block 660, the accuracy of the vectors computed at block 650 is determined, e.g., based on a comparison of the vectors computed at block 650 to ground-truth movement for each person. As stated, the accuracy may be based on the average displacement error and/or final displacement error. Generally, for example, if a first vector computed at block 650 indicates a person will move to the left, but the ground truth data indicates the person actually moved to the right, the prediction computed at block 650 may have a low accuracy. Therefore, at block 660, a backpropagation operation is performed to update the parameters of the trajectory module 104 (e.g., the social graph network 113, the stochastic model 108, the decoder model 109, and/or the LSTMs 110, 111). Generally, Equation 10 above may be used to maximize the variational lower bound of Equation 10 using stochastic gradient descent. Although blocks 610-660 may be discussed with reference to a single image and/or a single person depicted in each image, the blocks 610-660 may be repeated any number of times on any number of images in the training data 105. Doing so allows the trajectory module 104 to generate more accurate predictions over time.

Figure 7:
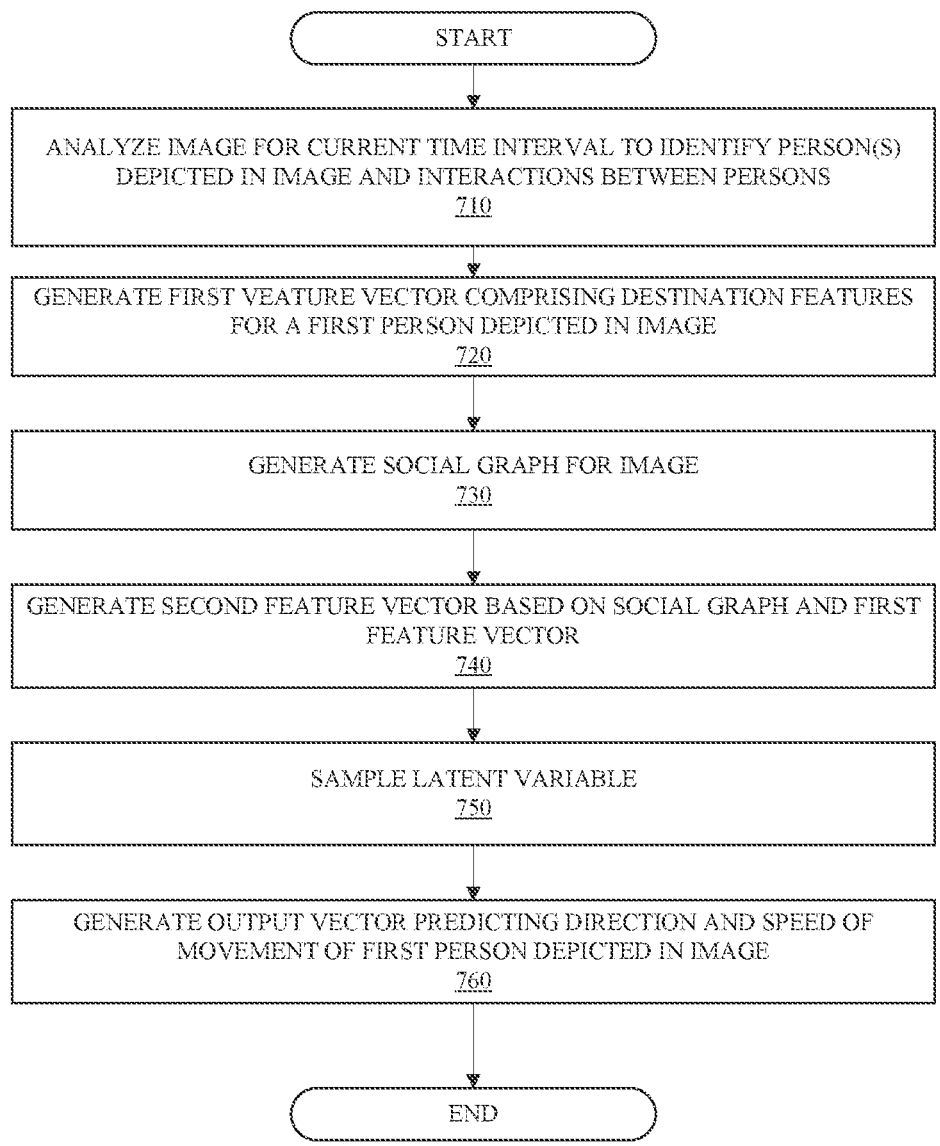
FIG. 7 illustrates an embodiment of a third logic flow.

FIG. 7 illustrates an embodiment of a logic flow 700. The logic flow 700 may be representative of some or all of the operations executed by one or more embodiments described herein. For example, the logic flow 700 may be representative of some or all of the operations to provide stochastic trajectory prediction using social graph networks. Embodiments are not limited in this context.

As shown, at block 710, an image may be analyzed by one or more CV algorithms 106 to identify one or more persons depicted in the image and/or interactions between at least two people depicted in the image. The image may be captured by the image capture device 103 and/or received from another source. The interactions may include whether one person is in view of another person, the distance between two people, communications, physical contact, one person avoiding another person, and the like. At block 720, a first feature vector, namely a destination feature vector $f^{(D)}$ comprising one or more destination-based features is generated according to Equation 1 for each person identified in the image by a neural network (e.g., the social network 113 of the trajectory module 104). As stated, the neural network may include the one-layer MLP with ReLU to concatenate the (x,y) coordinates of the person and the velocity of the person as input. The velocity may be based on a difference of the coordinates of the person at a current time interval and the coordinates of the person at a previous time interval (e.g., the preceding time interval). At block 730, a social graph 107 is generated for the image. The social graph 107 is a directed graph representing each person in the image as a node. If two or more people are determined to engage in social interactions based on the analysis of the image at block 710, an edge may connect the two people engaging in social interactions as described above. For example, if the distance between two people is below a threshold, a social interaction may be determined (and the attention value may be based on the distance). Similarly, if one person is in view of another person, an edge may connect the nodes representing the two people in the social graph 107, and the attention value may reflect the degree to which the person is in view of the other person.

At block 740, a second feature vector, namely the vector $f^{(S)}$ is computed according to Equations 2-6 for each person depicted in the image. The social graph network 113 may compute the second feature vector $f^{(S)}$ based on the first feature vector $f^{(D)}$ and/or the social graph 107. The output of the last layer of the social graph network 113 may comprise the vector $f^{(S)}$. At block 750, a value for the latent variable z is sampled from the learned prior distribution. At block 760, the decoder model 109 may compute one or more output vectors reflecting the predicted direction of movement and a predicted speed of the direction of movement of each person depicted in the image. The decoder model 109 may then store the generated vectors for later use.

Figure 8:
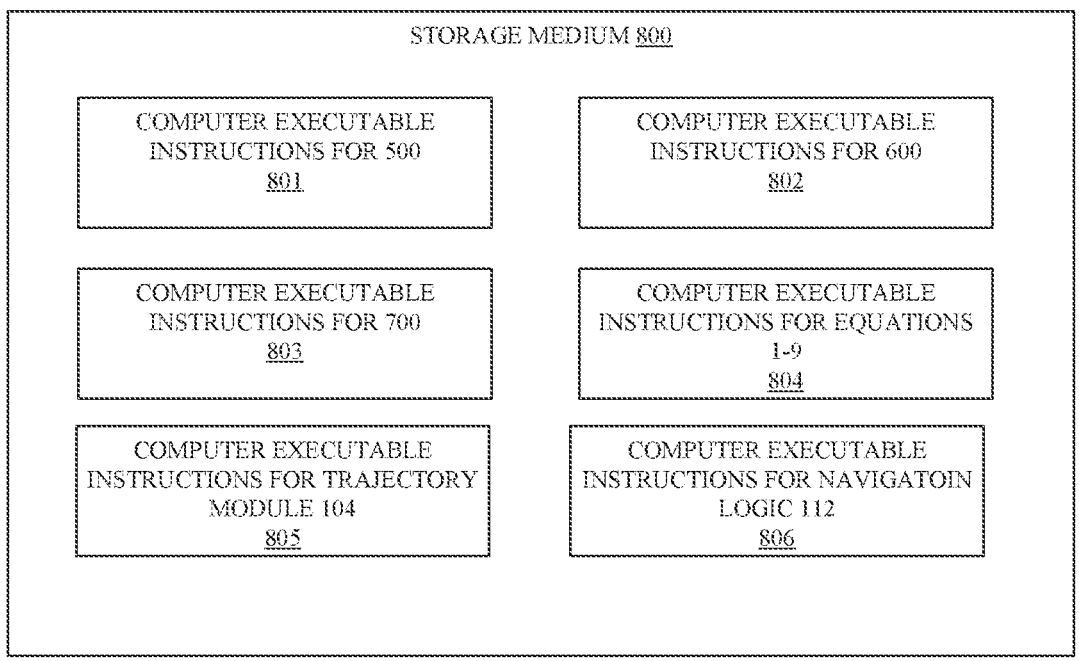
FIG. 8 illustrates an embodiment of a storage medium

FIG. 8 illustrates an embodiment of a storage medium 800. Storage medium 800 may comprise any non-transitory computer-readable storage medium or machine-readable storage medium, such as an optical, magnetic, or semiconductor storage medium. In various embodiments, storage medium 800 may comprise an article of manufacture. In some embodiments, storage medium 800 may store computer-executable instructions, such as computer-executable instructions to implement one or more of logic flows or operations described herein, such as instructions 801, 802, 803 for logic flows 500, 600, 700 of FIGS. 5-7, respectively. The storage medium 800 may further store computer-executable instructions 804 for Equations 1-9 described above, and computer-executable instructions 805 for the trajectory module 104 and components thereof (e.g., the social graph network 113, the social graph 107, the stochastic model 108, the decoder model 109, the instructions 114, and/or the LSTMs 110, 111). The storage medium 800 may further store computer-executable instructions 806 for the navigation logic 112. The processor 101 may execute any of the instructions 801-806. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 9:
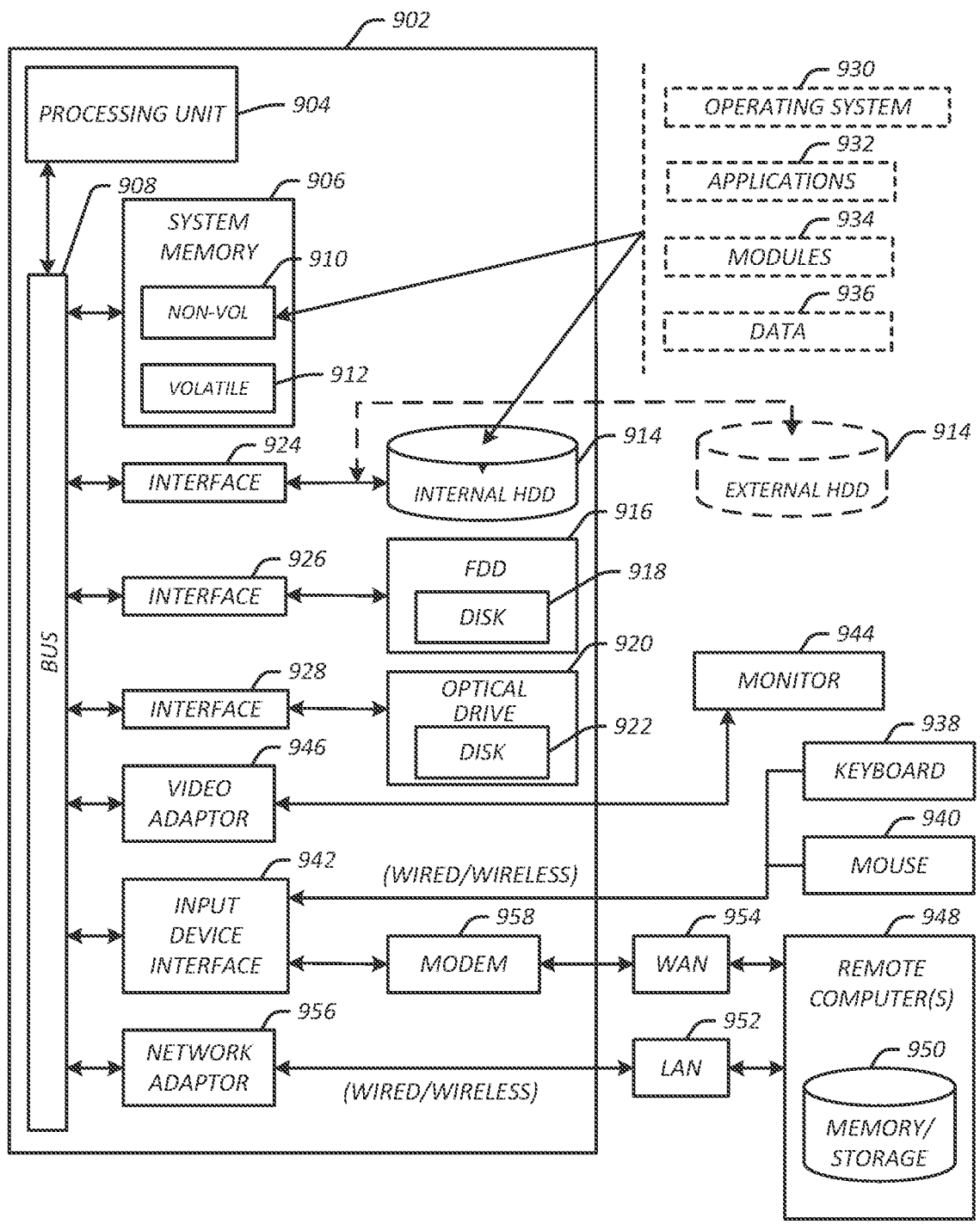
FIG. 9 illustrates an embodiment of a system.

FIG. 9 illustrates an embodiment of an exemplary computing architecture 900 that may be suitable for implementing various embodiments as previously described. In various embodiments, the computing architecture 900 may comprise or be implemented as part of an electronic device. In some embodiments, the computing architecture 900 may be representative, for example, of a computer system that implements one or more components of the system 100. The embodiments are not limited in this context. More generally, the computing architecture 900 is configured to implement all logic, systems, logic flows, methods, apparatuses, and functionality described herein and with reference to FIGS. 1-8.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media.

The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 (also referred to as a processor circuit) can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), bulk byte-addressable persistent memory (PMEM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a compact disc read-only memory (CD-ROM) or digital versatile disc (DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100, including the trajectory module 104, the CV algorithms 106, the social graph 107, the stochastic model 108, the decoder model 109, the LSTMs 110, 111, the navigation logic 112, the social graph network 113, and/or other logic described herein.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. In various embodiments, one or more migrations may occur via the networked environment.

The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 902 family of standards, such as wireless devices operatively disposed in wireless communication (e.g., IEEE 902.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 902.11x (a, b, g, n, ac, ay, etc.) to provide secure, reliable, fast wireless connectivity. A Wi-Fi network can be used to connect computers to each other, to the Internet, and to wire networks (which use IEEE 902.3-related media and functions).

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

The following examples pertain to further embodiments, from which numerous permutations and configurations will be apparent.

Example 1 is a non-transitory computer-readable storage medium storing instructions that when executed by a processor circuit cause the processor circuit to: determine a first feature vector describing destination features of a first person, of a plurality of people, depicted in an image; generate a directed graph for the image based on the plurality of people depicted in the image; determine, for the first person, a second feature vector based on the directed graph and the destination features; sample a value of a latent variable from a learned prior distribution, the latent variable to correspond to a first time interval; and generate, based on the sampled value and the feature vectors by a hierarchical long short-term memory (LSTM) comprising at least two LSTMs, an output vector comprising a direction of movement and a speed of the direction of movement of the first person at a second time interval, subsequent to the first time interval.

Example 2 includes the subject matter of example 1, the first feature vector to be determined by a first neural network based on input to comprise a location of the person at the first time interval and a velocity of the person at the first time interval, the velocity of the person at the first time interval based on the location of the person at the first time interval and a location of the first person at a third time interval, the third time interval prior to the first time interval, the first neural network to compute the first feature vector based at least in part on the following equation: $f_{j,t}^{D} = W^d [p_{j,t}, v_{j,t}] + b^d$.

Example 3 includes the subject matter of example 2, the location of the person at the first and third time intervals to comprise a respective set of polar coordinates, the output vector one of a plurality of output vectors generated for the first person, the output vectors to be computed based at least in part on the following equation: $p_\theta(v_t | z_{\leq t}, f_{<t}^{S}, f_{<t}^{D}) = LSTM_\theta(z_t, f_{t-1}^{S}, f_{t-1}^{D})$.

Example 4 includes the subject matter of example 2, the directed graph to comprise an adjacency matrix, a plurality of nodes, and a plurality of edges, each node to correspond to a respective one of the plurality of people depicted in the image, each edge connecting two of the nodes based on one of the plurality of people depicted in the image being in view of another one of the plurality of people depicted in the image, the adjacency matrix reflecting whether an edge connects two of the nodes.

Example 5 includes the subject matter of example 4, a first edge of the plurality of edges to connect a first node and a second node of the plurality of nodes, the computer-readable storage medium storing instructions that when executed by the processor circuit cause the processor circuit to: analyze the image to determine that the first person is in view of a second person of the plurality of people; generate the first edge in the graph, the first edge directed from the second node to the first node; determine an attention value for the first edge; and assign the attention value to the first edge.

Example 6 includes the subject matter of example 5, storing instructions that when executed by the processor circuit cause the processor circuit to: determine the second feature vector by the first neural network based on a message representing the first edge, the message to be determined based on an element-wise multiplication operator to be applied by the first neural network to the input to the first neural network, the element-wise operator to comprise a sigmoid activation function, the first neural network to determine the second feature vector based at least in part on one or more of the following equations:

$$f_j^{L+1} = f_j^L + \left( W^g \left( \sum_{\forall i, a_{ij}=1} M_{ij}(W^i x_{ij}^L + b^i) \right) + b^g \right);$$

$$x_{ij}^L = [f_i^L, f_j^L, W^r Polar_{pj}(p_i) + b^r]; M_{ij}^L = \sum_{\forall i, a_{ij}=1} \alpha_{ij}^L \cdot (x_{ij}^L \odot g_{ij}^L);$$

$$\alpha_{ij}^L = \frac{\exp(LeakyReLU(W^a x_{ij}^L))}{\sum_{\forall i, a_{ij}=1} \exp(LeakyReLU(W^a x_{ij}^L))}; g_{ij}^L = \text{sigmoid}(W^s x_{ij}^L + b^s).$$

Example 7 includes the subject matter of example 1, the computer-readable storage medium storing instructions that when executed by the processor circuit cause the processor circuit to: learn the prior distribution based on a plurality of recursive hidden states of a posterior LSTM and a prior vector of the first person at a third time interval, the third time interval prior to the first time interval, the prior vector to comprise a direction of movement and a speed of the direction of movement of the first person at the second time interval, the prior distribution learned based at least in part on the following equation: $p_\psi(z_t | f_{<t}^{S}) = LSTM_\psi(f_{t-1}^{S})$, the value for the latent variable sampled based at least in part on the following equation: $q_\phi(z_t | f_{\leq t}^{S}) = LSTM_\phi(f_t^{S})$.

Example 8 includes the subject matter of example 1, the hierarchical LSTM comprising at least two LSTMs including a first LSTM and a second LSTM, the first LSTM to receive the value of the latent variable and the second feature vector as input, the second LSTM to receive an output of the first LSTM and the first feature vector as input, the second LSTM to generate the output vector.

Example 9 includes the subject matter of example 1, storing instructions that when executed by the processor circuit cause the processor circuit to: generate, for each person depicted in the image, a respective output vector comprising a direction of movement and a speed of the direction of movement of the respective person at the second time interval.

Example 10 includes the subject matter of example 1, storing instructions that when executed by the processor circuit cause the processor circuit to: receive a second image corresponding to a third time interval subsequent to the first and second time intervals; determine a third feature vector describing destination features of the first person depicted in the second image; generate a second directed graph for the second image based on a plurality of people depicted in the image; determine, for the first person, a fourth feature vector based on the second directed graph and the third feature vector; sample a second value for the latent variable from the learned prior distribution, the second value for the latent variable to correspond to the third time interval; and generate, based on the sampled second value and the third and fourth feature vectors by the hierarchical LSTM, a second output vector comprising a direction of movement and a speed of the direction of movement of the first person at the third time interval.

Example 11 includes the subject matter of example 1, storing instructions that when executed by the processor circuit cause the processor circuit to: determine that the output vector intersects with a trajectory vector of an autonomous vehicle; determine, based on the determined intersection of the output vector and the trajectory vector, that a likelihood of a collision between the first person and an autonomous vehicle at a later time exceeds a collision threshold; and output an indication of the collision to at least one of the first person or the autonomous vehicle, a navigation logic of the autonomous vehicle to modify a movement of the autonomous vehicle to avoid the collision responsive to receipt of the indication.

Example 12 includes an apparatus, comprising: a processor circuit; and memory storing instructions which when executed by the processor circuit cause the processor circuit to: determine a first feature vector describing destination features of a first person, of a plurality of people, depicted in an image; generate a directed graph for the image based on the plurality of people depicted in the image; determine, for the first person, a second feature vector based on the directed graph and the destination features; sample a value of a latent variable from a learned prior distribution, the latent variable to correspond to a first time interval; and generate, based on the sampled value and the feature vectors by a hierarchical long short-term memory (LSTM) comprising at least two LSTMs, an output vector comprising a direction of movement and a speed of the direction of movement of the first person at a second time interval, subsequent to the first time interval.

Example 13 includes the subject matter of example 12, the first feature vector to be determined by a first neural network based on input to comprise a location of the person at the first time interval and a velocity of the person at the first time interval, the velocity of the person at the first time interval based on the location of the person at the first time interval and a location of the first person at a third time interval, the third time interval prior to the first time interval, the first neural network to compute the first feature vector based at least in part on the following equation: $f_{j,t}^D = W^d[p_{j,t}, v_{j,t}] + b^d$.

Example 14 includes the subject matter of example 13, the location of the person at the first and third time intervals to comprise a respective set of polar coordinates, the output vector one of a plurality of output vectors generated for the first person, the output vectors to be computed based at least in part on the following equation: $p_\theta(v_t|z_{\leq t}, f_{<t}, f_{<t}^D) = LSTM_\theta(z_t, f_{t-1}^S, f_{t-1}^D)$ . . . .

Example 15 includes the subject matter of example 13, the directed graph to comprise an adjacency matrix, a plurality of nodes, and a plurality of edges, each node to correspond to a respective one of the plurality of people depicted in the image, each edge connecting two of the nodes based on one of the plurality of people depicted in the image being in view of another one of the plurality of people depicted in the image, the adjacency matrix reflecting whether an edge connects two of the nodes.

Example 16 includes the subject matter of example 15, a first edge of the plurality of edges to connect a first node and a second node of the plurality of nodes, the memory storing instructions that when executed by the processor circuit cause the processor circuit to: analyze the image to determine that the first person is in view of a second person of the plurality of people; generate the first edge in the graph, the first edge directed from the second node to the first node; determine an attention value for the first edge; and assign the attention value to the first edge.

Example 17 includes the subject matter of example 16, the memory storing instructions which when executed by the processor circuit cause the processor circuit to: determine the second feature vector by the first neural network based on a message representing the first edge, the message to be determined based on an element-wise multiplication operator to be applied by the first neural network to the input to the first neural network, the element-wise operator to comprise a sigmoid activation function, the first neural network to determine the second feature vector based at least in part on one or more of the following equations:

$$f_j^{L+1} = f_j^L + \left(W^g\left(\sum_{\forall i, a_{ij}=1} M_{ij}(W^i x_{ij}^L + b^i)\right) + b^g\right);$$

$$x_{ij}^L = [f_i^L, f_j^L, W^r Polar_{pj}(p_i) + b^r]; M_{ij}^L = \sum_{\forall i, a_{ij}=1} \alpha_{ij}^L \cdot (x_{ij}^L \odot g_{ij}^L);$$

$$\alpha_{ij}^L = \frac{\exp(LeakyReLU(W^a x_{ij}^L))}{\sum_{\forall i, a_{ij}=1} \exp(LeakyReLU(W^a x_{ij}^L))}; g_{ij}^L = \text{sigmoid } (W^s x_{ij}^L + b^s).$$

Example 18 includes the subject matter of example 12, the memory storing instructions which when executed by the processor circuit cause the processor circuit to: learn the prior distribution based on a plurality of recursive hidden states of a posterior LSTM and a prior vector of the first person at a third time interval, the third time interval prior to the first time interval, the prior vector to comprise a direction of movement and a speed of the direction of movement of the first person at the second time interval, the prior distribution learned based at least in part on the following equation: $p_\psi(z_t|f_{<t}^S) = LSTM_\psi(f_{t-1}^S)$, the value for the latent variable sampled based at least in part on the following equation: $q_\phi(z_t|f_{\leq t}^S) = LSTM_\phi(f_t^S)$.

Example 19 includes the subject matter of example 12, the hierarchical LSTM comprising at least two LSTMs including a first LSTM and a second LSTM, the first LSTM to receive the value of the latent variable and the second feature vector as input, the second LSTM to receive an output of the first LSTM and the first feature vector as input, the second LSTM to generate the output vector.

Example 20 includes the subject matter of example 12, the memory storing instructions which when executed by the processor circuit cause the processor circuit to: generate, for each person depicted in the image, a respective output vector comprising a direction of movement and a speed of the direction of movement of the respective person at the second time interval.

Example 21 includes the subject matter of example 12, the memory storing instructions which when executed by the processor circuit cause the processor circuit to: receive a second image corresponding to a third time interval subsequent to the first and second time intervals; determine a third feature vector describing destination features of the first person depicted in the second image; generate a second directed graph for the second image based on a plurality of people depicted in the image; determine, for the first person, a fourth feature vector based on the second directed graph and the third feature vector; sample a second value for the latent variable from the learned prior distribution, the second value for the latent variable to correspond to the third time interval; and generate, based on the sampled second value and the third and fourth feature vectors by the hierarchical LSTM, a second output vector comprising a direction of movement and a speed of the direction of movement of the first person at the third time interval.

Example 22 includes the subject matter of example 12, the memory storing instructions which when executed by the processor circuit cause the processor circuit to: determine that the output vector intersects with a trajectory vector of an autonomous vehicle; determining, based on the determined intersection of the output vector and the trajectory vector, that a likelihood of a collision between the first person and an autonomous vehicle at a later time exceeds a collision threshold; and output an indication of the collision to at least one of the first person or the autonomous vehicle, a navigation logic of the autonomous vehicle to modify a movement of the autonomous vehicle to avoid the collision responsive to receipt of the indication.

Example 23 includes a method, comprising: determining a first feature vector describing destination features of a first person, of a plurality of people, depicted in an image; generating a directed graph for the image based on the plurality of people depicted in the image; determining, for the first person, a second feature vector based on the directed graph and the destination features; sampling a value of a latent variable from a learned prior distribution, the latent variable to correspond to a first time interval; and generating, based on the sampled value and the feature vectors by a hierarchical long short-term memory (LSTM) executing on a processor, an output vector comprising a direction of movement and a speed of the direction of movement of the first person at a second time interval, subsequent to the first time interval.

Example 24 includes the subject matter of example 23, the first feature vector to be determined by a first neural network based on input to comprise a location of the person at the first time interval and a velocity of the person at the first time interval, the velocity of the person at the first time interval based on the location of the person at the first time interval and a location of the first person at a third time interval, the third time interval prior to the first time interval, the first neural network to compute the first feature vector based at least in part on the following equation: $f_{j,t}^{D}=W^d[p_{j,t}, v_{j,t}]+b^d$.

Example 25 includes the subject matter of example 24, the location of the person at the first and third time intervals to comprise a respective set of polar coordinates, the output vector one of a plurality of output vectors generated for the first person, the output vectors to be computed based at least in part on the following equation: $p_\theta(v_t|z_{\leq t}, f_{<t}^S, f_{<t}^D)=LSTM_\theta(z_t, f_{t-1}^S, f_{t-1}^D)$.

Example 26 includes the subject matter of example 24, the directed graph to comprise an adjacency matrix, a plurality of nodes, and a plurality of edges, each node to correspond to a respective one of the plurality of people depicted in the image, each edge connecting two of the nodes based on one of the plurality of people depicted in the image being in view of another one of the plurality of people depicted in the image, the adjacency matrix reflecting whether an edge connects two of the nodes.

Example 27 includes the subject matter of example 26, a first edge of the plurality of edges to connect a first node and a second node of the plurality of nodes, the method further comprising: analyzing the image to determine that the first person is in view of a second person of the plurality of people; generating the first edge in the graph, the first edge directed from the second node to the first node; determining an attention value for the first edge; and assigning the attention value to the first edge.

Example 28 includes the subject matter of example 27, further comprising: determining the second feature vector by the first neural network based on a message representing the first edge, the message to be determined based on an element-wise multiplication operator to be applied by the first neural network to the input to the first neural network, the element-wise operator to comprise a sigmoid activation function, the first neural network to determine the second feature vector based at least in part on one or more of the following equations:

$$f_j^{L+1} = f_j^L + \left(W^g\left(\sum_{\forall i, a_{ij}=1} M_{ij}(W^i x_{ij}^L + b^i)\right) + b^g\right);$$

$$x_{ij}^L = [f_i^L, f_j^L, W^r Polar_{pj}(p_i) + b^r)]; M_{ij}^L = \sum_{\forall i, a_{ij}=1} \alpha_{ij}^L \cdot (x_{ij}^L \odot g_{ij}^L);$$

$$\alpha_{ij}^L = \frac{\exp(LeakyReLU(W^a x_{ij}^L))}{\sum_{\forall i, a_{ij}=1} \exp(LeakyReLU(W^a x_{ij}^L))}; g_{ij}^L = \text{sigmoid } (W^s x_{ij}^L + b^s).$$

Example 29 includes the subject matter of example 23, further comprising: learning the prior distribution based on a plurality of recursive hidden states of a posterior LSTM and a prior vector of the first person at a third time interval, the third time interval prior to the first time interval, the prior vector to comprise a direction of movement and a speed of the direction of movement of the first person at the second time interval, the prior distribution learned based at least in part on the following equation: $p_\psi(z_t|f_{<t}^S)=LSTM_\psi(f_{t-1}^S)$, the value for the latent variable sampled based at least in part on the following equation: $q_\phi(z_t|f_{\leq t}^S)=LSTM_\phi(f_t^S)$.

Example 30 includes the subject matter of example 23, the hierarchical LSTM comprising at least two LSTMs including a first LSTM and a second LSTM, the first LSTM to receive the value of the latent variable and the second feature vector as input, the second LSTM to receive an output of the first LSTM and the first feature vector as input, the second LSTM to generate the output vector.

Example 31 includes the subject matter of example 23, further comprising: generating, for each person depicted in the image, a respective output vector comprising a direction of movement and a speed of the direction of movement of the respective person at the second time interval.

Example 32 includes the subject matter of example 23, further comprising: receiving a second image corresponding to a third time interval subsequent to the first and second time intervals; determining a third feature vector describing destination features of the first person depicted in the second image; generating a second directed graph for the second image based on a plurality of people depicted in the image; determining, for the first person, a fourth feature vector based on the second directed graph and the third feature vector; sampling a second value for the latent variable from the learned prior distribution, the second value for the latent variable to correspond to the third time interval; and generating, based on the sampled second value and the third and fourth feature vectors by the hierarchical LSTM, a second output vector comprising a direction of movement and a speed of the direction of movement of the first person at the third time interval.

Example 33 includes the subject matter of example 23, further comprising: determining that the output vector intersects with a trajectory vector of an autonomous vehicle; determining, based on the determined intersection of the output vector and the trajectory vector, that a likelihood of a collision between the first person and an autonomous vehicle at a later time exceeds a collision threshold; outputting an indication of the collision to at least one of the first person or the autonomous vehicle; receiving, by a navigation logic of the autonomous vehicle, the indication of the collision; and modifying, by the navigation logic, a movement of the autonomous vehicle to avoid the collision.

Example 34 is an apparatus, comprising: means for determining a first feature vector describing destination features of a first person, of a plurality of people, depicted in an image; means for generating a directed graph for the image based on the plurality of people depicted in the image; means for determining, for the first person, a second feature vector based on the directed graph and the destination features; means for sampling a value of a latent variable from a learned prior distribution, the latent variable to correspond to a first time interval; and means for generating, based on the sampled value and the feature vectors by a hierarchical long short-term memory (LSTM) comprising at least two LSTMs, an output vector comprising a direction of movement and a speed of the direction of movement of the first person at a second time interval, subsequent to the first time interval.

Example 35 includes the subject matter of example 34, the first feature vector to be determined by a first neural network based on input to comprise a location of the person at the first time interval and a velocity of the person at the first time interval, the velocity of the person at the first time interval based on the location of the person at the first time interval and a location of the first person at a third time interval, the third time interval prior to the first time interval, the first neural network to compute the first feature vector based at least in part on the following equation: $f_{j,t}^D = W^d[p_{j,t}, v_{j,t}] + b^d$.

Example 36 includes the subject matter of example 35, the location of the person at the first and third time intervals to comprise a respective set of polar coordinates, the output vector one of a plurality of output vectors generated for the first person, the output vectors to be computed based at least in part on the following equation: $p_\theta(v_t|z_{\leq t}, f_{<t}^S, f_{<t}^D) = LSTM_\theta(z_t, f_{t-1}^S, f_{t-1}^D)$.

Example 37 includes the subject matter of example 35, the directed graph to comprise an adjacency matrix, a plurality of nodes, and a plurality of edges, each node to correspond to a respective one of the plurality of people depicted in the image, each edge connecting two of the nodes based on one of the plurality of people depicted in the image being in view of another one of the plurality of people depicted in the image, the adjacency matrix reflecting whether an edge connects two of the nodes.

Example 38 includes the subject matter of example 37, a first edge of the plurality of edges to connect a first node and a second node of the plurality of nodes, the apparatus further comprising: means for analyzing the image to determine that the first person is in view of a second person of the plurality of people; generating the first edge in the graph, the first edge directed from the second node to the first node; means for determining an attention value for the first edge; and means for assigning the attention value to the first edge.

Example 39 includes the subject matter of example 38, further comprising: means for determining the second feature vector by the first neural network based on a message representing the first edge, the message to be determined based on an element-wise multiplication operator to be applied by the first neural network to the input to the first neural network, the element-wise operator to comprise a sigmoid activation function, the first neural network to determine the second feature vector based at least in part on one or more of the following equations:

$$f_j^{L+1} = f_j^L + \left(W^g\left(\sum_{\forall i, a_{ij}=1} M_{ij}(W^i x_{ij}^L + b^i)\right) + b^g\right);$$

$$x_{ij}^L = [f_i^L, f_j^L, W^r Polar_{pj}(p_i) + b^r)]; M_{ij}^L = \sum_{\forall i, a_{ij}=1} \alpha_{ij}^L \cdot (x_{ij}^L \odot g_{ij}^L);$$

$$\alpha_{ij}^L = \frac{\exp(LeakyReLU(W^a x_{ij}^L))}{\sum_{\forall i, a_{ij}=1} \exp(LeakyReLU(W^a x_{ij}^L))}; g_{ij}^L = \text{sigmoid } (W^s x_{ij}^L + b^s).$$

Example 40 includes the subject matter of example 34, further comprising: means for learning the prior distribution based on a plurality of recursive hidden states of a posterior LSTM and a prior vector of the first person at a third time interval, the third time interval prior to the first time interval, the prior vector to comprise a direction of movement and a speed of the direction of movement of the first person at the second time interval, the prior distribution learned based at least in part on the following equation: $p_\psi(z_t|f_{<t}^S) = LSTM_\psi(f_{t-1}^S)$, the value for the latent variable sampled based at least in part on the following equation: $q_\phi(z^t|f_{\leq t}^S) = LSTM_\phi(f_t^S)$.

Example 41 includes the subject matter of example 34, the hierarchical LSTM comprising at least two LSTMs including a first LSTM and a second LSTM, the first LSTM to receive the value of the latent variable and the second feature vector as input, the second LSTM to receive an output of the first LSTM and the first feature vector as input, the second LSTM to generate the output vector.

Example 42 includes the subject matter of example 34, further comprising: means for generating, for each person depicted in the image, a respective output vector comprising a direction of movement and a speed of the direction of movement of the respective person at the second time interval.

Example 43 includes the subject matter of example 34, further comprising: means for receiving a second image corresponding to a third time interval subsequent to the first and second time intervals; means for determining a third feature vector describing destination features of the first person depicted in the second image; means for generating a second directed graph for the second image based on a plurality of people depicted in the image; means for determining, for the first person, a fourth feature vector based on the second directed graph and the third feature vector; means for sampling a second value for the latent variable from the learned prior distribution, the second value for the latent variable to correspond to the third time interval; and means for generating, based on the sampled second value and the third and fourth feature vectors by the hierarchical LSTM, a second output vector comprising a direction of movement and a speed of the direction of movement of the first person at the third time interval.

Example 44 includes the subject matter of example 34, further comprising: means for determining that the output vector intersects with a trajectory vector of an autonomous vehicle; means for determining, based on the determined intersection of the output vector and the trajectory vector, that a likelihood of a collision between the first person and an autonomous vehicle at a later time exceeds a collision threshold; means for outputting an indication of the collision to at least one of the first person or the autonomous vehicle; means for receiving, by a navigation logic of the autonomous vehicle, the indication of the collision; and means for modifying, by the navigation logic, a movement of the autonomous vehicle to avoid the collision.

In addition, in the foregoing, various features are grouped together in a single example to streamlining the disclosure.

This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A non-transitory computer-readable storage medium storing instructions that when executed by a processor circuit cause the processor circuit to:
   determine a first feature vector describing destination features of a first person, of a plurality of people, depicted in an image;
   generate a directed graph for the image based on the plurality of people depicted in the image;
   determine, for the first person, a second feature vector based on the directed graph and the destination features;
   sample a value of a latent variable from a learned prior distribution, the latent variable to correspond to a first time interval; and
   generate, based on the sampled value and the feature vectors by a hierarchical long short-term memory (LSTM), an output vector comprising a direction of movement and a speed of the direction of movement of the first person at a second time interval, subsequent to the first time interval.

2. The computer-readable storage medium of claim 1, the first feature vector to be determined by a first neural network based on input to comprise a location of the person at the first time interval and a velocity of the person at the first time interval, the velocity of the person at the first time interval based on the location of the person at the first time interval and a location of the first person at a third time interval, the third time interval prior to the first time interval.

3. The computer-readable storage medium of claim 2, the location of the person at the first and third time intervals to comprise a respective set of polar coordinates, the output vector one of a plurality of output vectors generated for the first person.

4. The computer-readable storage medium of claim 2, the directed graph to comprise an adjacency matrix, a plurality of nodes, and a plurality of edges, each node to correspond to a respective one of the plurality of people depicted in the image, each edge connecting two of the nodes based on one of the plurality of people depicted in the image being in view of another one of the plurality of people depicted in the image, the adjacency matrix reflecting whether an edge connects two of the nodes.

5. The computer-readable storage medium of claim 4, a first edge of the plurality of edges to connect a first node and a second node of the plurality of nodes, the computer-readable storage medium storing instructions that when executed by the processor circuit cause the processor circuit to:
analyze the image to identify an interaction from the first person directed to a second person of the plurality of people;
generate the first edge in the graph based on the identified interaction, the first person associated with the first node, the second person associated with the second node;
determine an attention value for the first edge, the attention value to reflect a degree of the interaction; and
assign the attention value to the first edge.

6. The computer-readable storage medium of claim 5, storing instructions that when executed by the processor circuit cause the processor circuit to:
determine the second feature vector by the first neural network based on a message representing the first edge, the message to be determined based on an element-wise multiplication operator to be applied by the first neural network to the input to the first neural network, the element-wise operator to comprise a sigmoid activation function.

7. The computer-readable storage medium of claim 1, the computer-readable storage medium storing instructions that when executed by the processor circuit cause the processor circuit to:
learn the prior distribution based on a plurality of recursive hidden states of a third LSTM and a prior vector of the first person at a third time interval, the third time interval prior to the first time interval, the prior vector to comprise a direction of movement and a speed of the direction of movement of the first person at the second time interval.

8. The computer-readable storage medium of claim 1, the hierarchical LSTM comprising at least two LSTMs including a first LSTM and a second LSTM, the first LSTM to receive the value of the latent variable and the second feature vector as input, the second LSTM to receive an output of the first LSTM and the first feature vector as input, the second LSTM to generate the output vector.

9. The computer-readable storage medium of claim 1, storing instructions that when executed by the processor circuit cause the processor circuit to:
determine that the output vector intersects with a trajectory vector of an autonomous vehicle;
determine, based on the determined intersection of the output vector and the trajectory vector, that a likelihood of a collision between the first person and an autonomous vehicle at a later time exceeds a collision threshold; and
output an indication of the collision to at least one of the first person or the autonomous vehicle, a navigation logic of the autonomous vehicle to modify a movement of the autonomous vehicle to avoid the collision responsive to receipt of the indication.

10. An apparatus, comprising:
a processor circuit; and
memory storing instructions which when executed by the processor circuit cause the processor circuit to:
determine a first feature vector describing destination features of a first person, of a plurality of people, depicted in an image;
generate a directed graph for the image based on the plurality of people depicted in the image;
determine, for the first person, a second feature vector based on the directed graph and the destination features;
sample a value of a latent variable from a learned prior distribution, the latent variable to correspond to a first time interval; and
generate, based on the sampled value and the feature vectors by a hierarchical long short-term memory (LSTM), an output vector comprising a direction of movement and a speed of the direction of movement of the first person at a second time interval, subsequent to the first time interval.

11. The apparatus of claim 10, the first feature vector to be determined by a first neural network based on input to comprise a location of the person at the first time interval and a velocity of the person at the first time interval, the velocity of the person at the first time interval based on the location of the person at the first time interval and a location of the first person at a third time interval, the third time interval prior to the first time interval.

12. The apparatus of claim 11, the location of the person at the first and third time intervals to comprise a respective set of polar coordinates, the output vector one of a plurality of output vectors generated for the first person.

13. The apparatus of claim 11, the directed graph to comprise an adjacency matrix, a plurality of nodes, and a plurality of edges, each node to correspond to a respective one of the plurality of people depicted in the image, each edge connecting two of the nodes based on one of the plurality of people depicted in the image being in view of another one of the plurality of people depicted in the image, the adjacency matrix reflecting whether an edge connects two of the nodes.

14. The apparatus of claim 13, a first edge of the plurality of edges to connect a first node and a second node of the plurality of nodes, the memory storing instructions that when executed by the processor circuit cause the processor circuit to:
analyze the image to identify an interaction from the first person directed to a second person of the plurality of people;
generate the first edge in the graph based on the identified interaction, the first person associated with the first node, the second person associated with the second node;
determine an attention value for the first edge, the attention value to reflect a degree of the interaction; and
assign the attention value to the first edge.

15. The apparatus of claim 10, the memory storing instructions which when executed by the processor circuit cause the processor circuit to:

learn the prior distribution based on a plurality of recursive hidden states of a third LSTM and a prior vector of the first person at a third time interval, the third time interval prior to the first time interval, the prior vector to comprise a direction of movement and a speed of the direction of movement of the first person at the second time interval.

16. The apparatus of claim 10, the hierarchical LSTM comprising at least two LSTMs including a first LSTM and a second LSTM, the first LSTM to receive the value of the latent variable and the second feature vector as input, the second LSTM to receive an output of the first LSTM and the first feature vector as input, the second LSTM to generate the output vector.

17. The apparatus of claim 10, the memory storing instructions which when executed by the processor circuit cause the processor circuit to:

determine that the output vector intersects with a trajectory vector of an autonomous vehicle;

determine, based on the determined intersection of the output vector and the trajectory vector, that a likelihood of a collision between the first person and an autonomous vehicle at a later time exceeds a collision threshold; and output an indication of the collision to at least one of the first person or the autonomous vehicle, a navigation logic of the autonomous vehicle to modify a movement of the autonomous vehicle to avoid the collision responsive to receipt of the indication.

18. A method, comprising:

determining a first feature vector describing destination features of a first person, of a plurality of people, depicted in an image;

generating a directed graph for the image based on the plurality of people depicted in the image;

determining, for the first person, a second feature vector based on the directed graph and the destination features;

sampling a value of a latent variable from a learned prior distribution, the latent variable to correspond to a first time interval; and generating, based on the sampled value and the feature vectors by a hierarchical long short-term memory (LSTM) executing on a processor, an output vector comprising a direction of movement and a speed of the direction of movement of the first person at a second time interval, subsequent to the first time interval.

19. The method of claim 18, the first feature vector to be determined by a first neural network based on input to comprise a location of the person at the first time interval and a velocity of the person at the first time interval, the velocity of the person at the first time interval based on the location of the person at the first time interval and a location of the first person at a third time interval, the third time interval prior to the first time interval.

20. The method of claim 19, the directed graph to comprise an adjacency matrix, a plurality of nodes, and a plurality of edges, each node to correspond to a respective one of the plurality of people depicted in the image, each edge connecting two of the nodes based on one of the plurality of people depicted in the image being in view of another one of the plurality of people depicted in the image, the adjacency matrix reflecting whether an edge connects two of the nodes.

21. The method of claim 20, a first edge of the plurality of edges to connect a first node and a second node of the plurality of nodes, the method further comprising:

analyzing the image to identify an interaction from the first person directed to a second person of the plurality of people;

generating the first edge in the graph based on the identified interaction, the first person associated with the first node, the second person associated with the second node;

determining an attention value for the first edge, the attention value to reflect a degree of the interaction; and assigning the attention value to the first edge.

22. The method of claim 21, further comprising:

determining the second feature vector by the first neural network based on a message representing the first edge, the message to be determined based on an element-wise multiplication operator to be applied by the first neural network to the input to the first neural network, the element-wise operator to comprise a sigmoid activation function.

23. The method of claim 18, further comprising:

learning the prior distribution based on a plurality of recursive hidden states of a third LSTM and a prior vector of the first person at a third time interval, the third time interval prior to the first time interval, the prior vector to comprise a direction of movement and a speed of the direction of movement of the first person at the second time interval.

24. The method of claim 18, the hierarchical LSTM comprising at least two LSTMs including a first LSTM and a second LSTM, the first LSTM to receive the value of the latent variable and the second feature vector as input, the second LSTM to receive an output of the first LSTM and the first feature vector as input, the second LSTM to generate the output vector.

25. The method of claim 18, further comprising:

determining that the output vector intersects with a trajectory vector of an autonomous vehicle;

determining, based on the determined intersection of the output vector and the trajectory vector, that a likelihood of a collision between the first person and an autonomous vehicle at a later time exceeds a collision threshold;

outputting an indication of the collision to at least one of the first person or the autonomous vehicle;

receiving, by a navigation logic of the autonomous vehicle, the indication of the collision; and modifying, by the navigation logic, a movement of the autonomous vehicle to avoid the collision.

* * * * *